United States Patent
Ando et al.

(10) Patent No.: US 6,658,229 B2
(45) Date of Patent: Dec. 2, 2003

(54) RECORDING MATERIAL SEPARATING APPARATUS OF WHICH SEPARATING MEMBER IS RETRACTABLE IN OPERATIVE ASSOCIATION WITH GUIDE

(75) Inventors: Masao Ando, Shizuoka (JP); Takahiro Azeta, Shizuoka (JP); Yasunari Kobaru, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/939,777

(22) Filed: Aug. 28, 2001

(65) Prior Publication Data
US 2002/0025204 A1 Feb. 28, 2002

(30) Foreign Application Priority Data
Aug. 30, 2000 (JP) .......................................... 2000-260757

(51) Int. Cl.$^7$ ................................................. G03G 15/20
(52) U.S. Cl. ......................... 399/323; 271/311; 271/900
(58) Field of Search ................................. 399/323, 398, 399/399; 271/311, 900

(56) References Cited
U.S. PATENT DOCUMENTS

| 4,953,846 | A | 9/1990 | Azeta et al. | 271/251 |
|---|---|---|---|---|
| 5,162,857 | A | 11/1992 | Higeta et al. | 355/309 |
| 5,240,242 | A | 8/1993 | Ando et al. | 271/118 |
| 5,358,230 | A | 10/1994 | Ikemori et al. | 271/114 |
| 5,386,983 | A | 2/1995 | Ando | 271/118 |
| 5,501,444 | A | 3/1996 | Yukimachi et al. | 271/127 |
| 6,032,949 | A | 3/2000 | Ando | 271/225 |
| 6,259,881 | B1 * | 7/2001 | Nakamura | 399/323 |

FOREIGN PATENT DOCUMENTS

| JP | 1-101574 A | * | 4/1989 |
| JP | 2-190886 A | * | 7/1990 |
| JP | 10-333465 A | * | 12/1998 |

* cited by examiner

Primary Examiner—Joan Pendegrass
(74) Attorney, Agent, or Firm—Fitzpatrick, Cella, Harper & Scinto

(57) ABSTRACT

A recording material separating apparatus has a rotary member contacting with a recording material, a separating member for contacting with the rotary member and separating the recording material from the rotary member, and a guide member for guiding that surface of the recording material separated from the rotary member which is adjacent to the rotary member. The guide member is provided for retraction from a guide position by the pressure of the recording material when jammed, and the separating member is retracted from a separating position in operative association with the retracting action of the guide member.

8 Claims, 25 Drawing Sheets

RECORDING MATERIAL SEPARATING APPARATUS OF WHICH SEPARATING MEMBER IS RETRACTABLE IN OPERATIVE ASSOCIATION WITH GUIDE

BACKGROUND OF THE INVENTION

1. Field of the Invention

This invention relates to a recording material separating apparatus suitably used in the fixing apparatus of an image forming apparatus to separate a recording material from a rotary member.

2. Description of the Related Art

In an image forming apparatus such as a copier, a laser printer or a facsimile apparatus, there is known and practically used a recording material separating apparatus provided with a separating member disposed on the downstream side of a pair of rotary members rotated in pressure contact with each other with respect to the conveyance direction of a recording material so as to be capable of contacting with at least one of the rotary members and to separate the recording material after passed through the nip portion from the rotary member during the contact of the separating member with the rotary member, a biasing member for biasing the separating member toward the rotary member, and a guide member for guiding the recording material separated from the rotary member in the conveyance direction.

For example, as such a recording material separating apparatus, there is known a construction in which as disclosed in Japanese Patent Application Laid-Open No. 10-333465, a guide member is provided near a separating claw which is a separating member. This guide member has the role of preventing a recording material from contacting with the separating claw when the stagnation of the recording material (hereinafter referred to as jam) occurs downstream of a fixing apparatus with respect to the conveyance direction of the recording material and the recording material becomes like bellows, and preventing a heating roller which is a rotary member from being injured by the separating claw.

In the above-described prior-art recording material separating apparatus, however, the tip end of the separating claw (the contact portion thereof with the heating roller) is slightly exposed from the guide member to separate the recording material from the heating roller. Accordingly, when jam occurs, it has been difficult to completely prevent the bellows-shaped recording material from contacting the separating claw. Particularly, when jam occurs to a recording material bearing thereon a toner image high in print percentage such as solid black, the bellows-shaped recording material may have been secured in a state in which it is finely folded by a toner, and have become liable to abut against the tip end of the separating claw and eat into the heating roller to thereby injure the roller. Also, when the heating roller is injured, a bad image such as uneven fixing may occur to the printed surface of a recording material conveyed.

SUMMARY OF THE INVENTION

It is an object of the present invention to provide a recording material separating apparatus which does not injure the surface of a rotary member by a separating member.

It is another object of the present invention to provide a recording material separating apparatus of which the separating member is retractable from a separating position during jam.

It is still another object of the present invention to provide a recording material separating apparatus comprising:

a rotary member contacting with a recording material;

a separating member for contacting with the rotary member and separating the recording material from the rotary member; and a guide member for guiding that surface of the recording material separated from the rotary member which is adjacent to the rotary member, the guide member being provided for retraction from a guide position by the pressure of the recording material when jammed;

the separating member being retracted from a separating position in operative association with the retracting operation of the guide member.

Further objects of the present invention will become apparent from the following description.

DESCRIPTION OF THE PREFERRED EMBODIMENTS

Some embodiments of the present invention will hereinafter be described with reference to the accompanying drawings.

(First Embodiment)

A first embodiment of the present invention will first be described.

Figure 1:
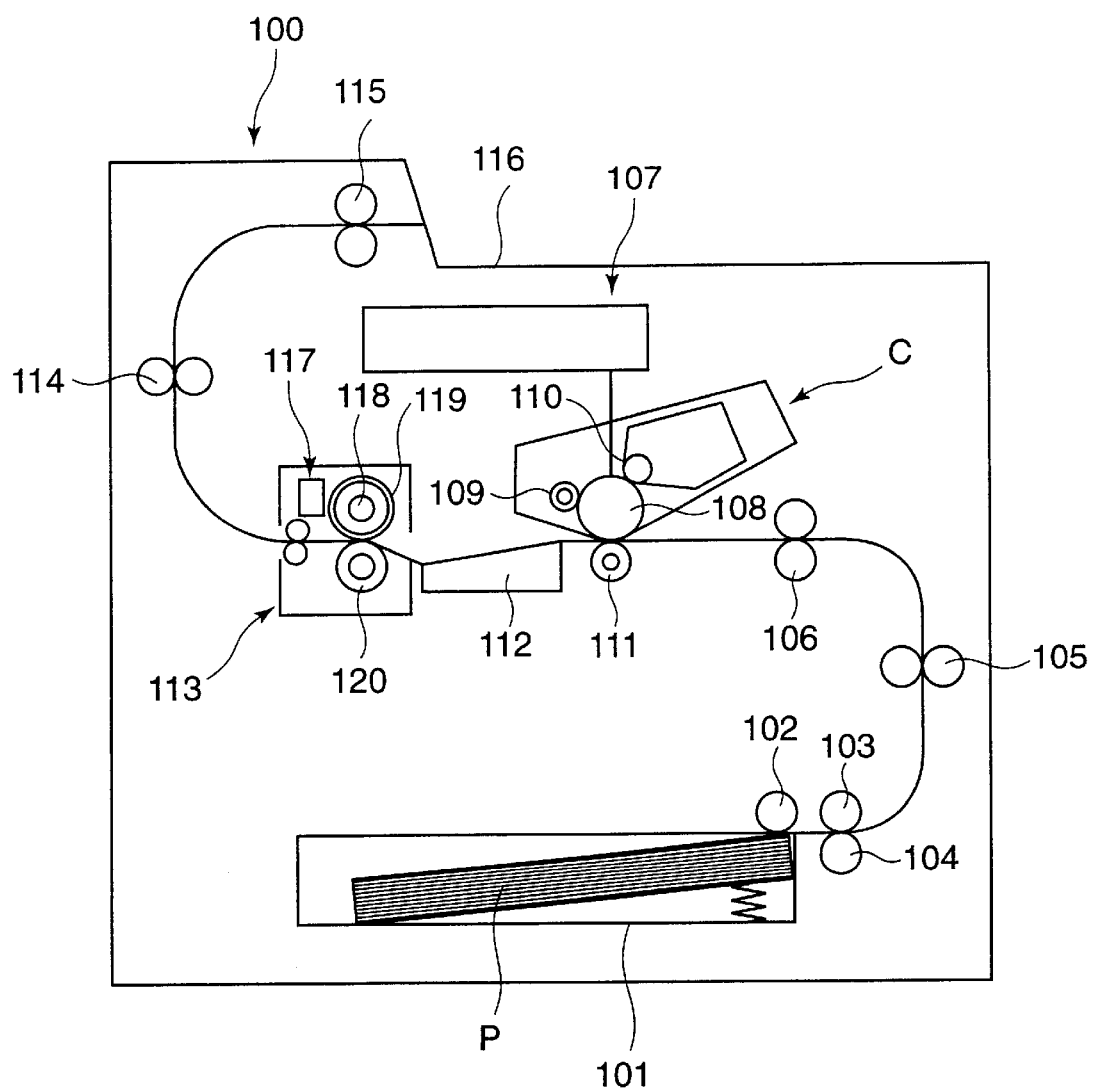
FIG. 1 is a typical cross-sectional view schematically showing the construction of an image forming apparatus according to a first embodiment of the present invention.

FIG. 1 is a cross-sectional view schematically showing the construction of a laser beam printer 100 which is an image recording apparatus according to the present embodiment.

The laser beam printer 100 has a deck 101 containing therein recording sheets P which are recording materials, and is provided with a pickup roller 102 for paying out the recording sheets P from within this deck 101, a deck sheet feeding roller 103 for conveying the recording sheets P paid out by the pickup roller 102, and a retard roller 104 forming a pair with the deck sheet feeding roller 103 and for preventing the double feeding of the recording sheets P.

On the downstream side of the deck sheet feeding roller 103 with respect to the conveyance direction of the recording sheets P, there are disposed a pair sheet conveying rollers 105 for conveying the recording sheets P to the downstream of the deck 101 with respect to the conveyance direction of the sheets P (hereinafter simply referred to as downstream), and a pair of registration rollers for conveying the recording sheets P in synchronism with the image forming operation.

Also, downstream of the pair of registration rollers 106, a process cartridge C constituting image forming means for forming a toner image on a photosensitive drum 108 on the basis of a laser beam from a laser scanner portion 107 which will be described later is detachably attached to the main body of the apparatus.

This process cartridge C is provided with the rotatable photosensitive drum 108, and an electrifying roller 109, a developing device 110 and a cleaning device (not shown) around the photosensitive drum, and during image formation, the surface of the photosensitive drum 108 is uniformly electrified by the electrifying roller 109 and also, selective exposure is effected from the laser scanner portion 107 to thereby form a latent image, which is then toner-developed and visualized by the developing device 110. A transferring bias voltage is then applied to a transferring roller 111, whereby the toner image is transferred to the recording sheet P conveyed thereto to thereby form an image.

Further, downstream of the transferring roller 111, there is provided a conveying guide 112 and a fixing apparatus 113 for heat-fixing the toner image transferred onto the recording sheet P. This fixing apparatus 113 is provided with a sheet separating apparatus, and the construction thereof will be described later.

Thereafter, the recording sheet P is conveyed to discharge rollers 115 by a pair of conveying rollers 114, and then is discharged onto a discharge tray 116 on the upper surface of the main body of the apparatus by the discharge rollers 115.

Figure 2:
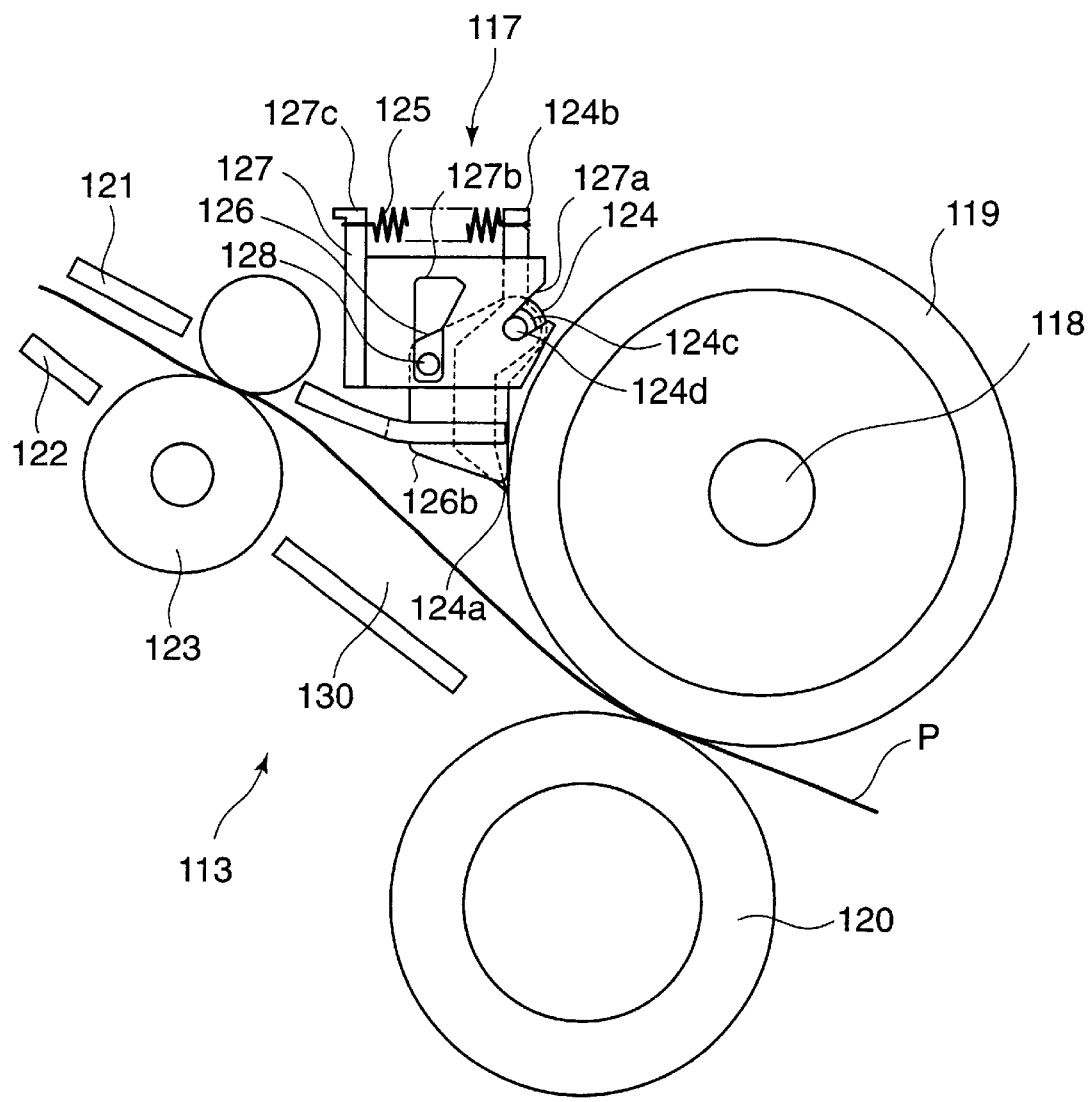
FIG. 2 is a typical cross-sectional view schematically showing the construction of a fixing apparatus provided in the image forming apparatus of FIG. 1.
Figure 3:
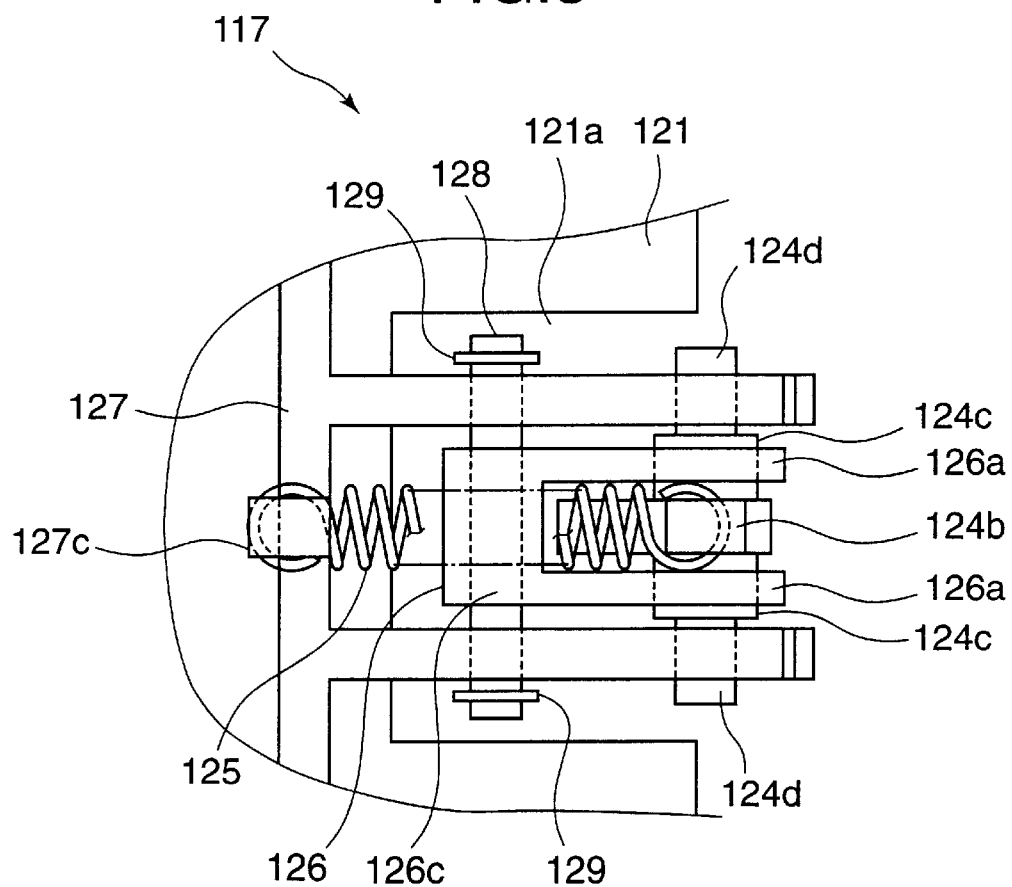
FIG. 3 is a top plan view of a recording material separating apparatus provided in the fixing apparatus of FIG. 2.
Figure 4:
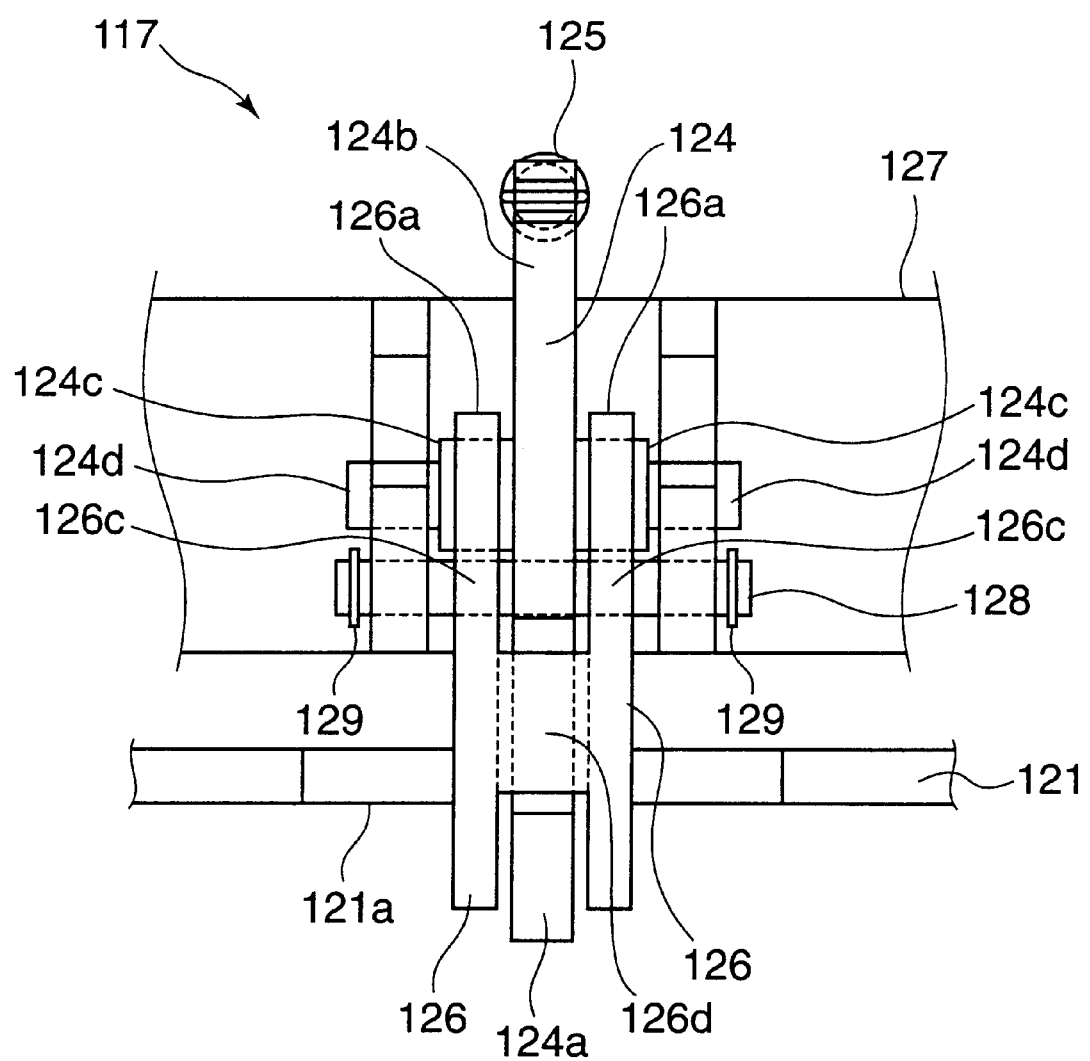
FIG. 4 is a right side view of the recording material separating apparatus provided in the fixing apparatus of FIG. 2.

The construction of the fixing apparatus 113 provided in the laser beam printer 100, and the construction of a sheet separating apparatus 117 which is a recording material separating apparatus provided in the fixing apparatus 113 will now be described with reference to FIGS. 2 to 4. FIG. 2 is a typical cross-sectional view schematically showing the construction of the fixing apparatus, FIG. 3 is a top plan view of the sheet separating apparatus 117, and FIG. 4 is a right side view of the sheet separating apparatus 117.

As shown in FIG. 2, the fixing apparatus 113 is provided with a heating roller 119 which is a rotary member having a heating member 118 (halogen heater) therein, a pressure roller 120 which is a rotary member being in pressure contact with the heating roller 119, an upper separation guide 121 and a lower separation guide 122 which provide a discharge side guide, and a pair of fixing and discharge rollers 123.

Also, the fixing apparatus 113 is provided with the sheet separating apparatus 117 near the downstream side of the pressure contact portion between the heating roller 119 and the pressure roller 120 so that the recording sheet P passed through the pressure contact portion and separated from the heating roller 119 by the sheet separating apparatus 117 may be directed to the pair of fixing and discharge rollers 123 by a sheet conveying path 130 formed by the upper separation guide 121 and the lower separation guide 122.

Usually, when the toner image printed on the recording sheet is to be heated and fixed, the heating roller is disposed on the printed surface side, but the recording sheet adheres to and twines around this heating roller. In order to prevent this, usually separating means such as a separating claw is provided on the heating roller side.

The sheet separating apparatus 117 according to the present embodiment is comprised of a separating claw 124 which is a separating member, a resilient member 125 which is a biasing member, a guide member 126, a supporting member 127, an engagement pin 128, stoppers 129, etc.

A separating portion 124a for separating the heated and fixed recording sheet P from the heating roller 119 is provided on one end of the separating claw 124, and a restraining portion 124b for restraining the resilient member 125 is provided on the other end of the separating claw 124.

Also, a spindle A124c and a spindle B124d are formed coaxially with each other.

The guide member 126 is formed with an aperture 126 pivotally supported by the spindle 124c of the separating claw 124, a guide portion 126b for guiding the recording sheet P separated by the separating claw 124 to the upper separation guide 121, an aperture 126c into which the engagement pin 128 is inserted, a separating claw abutting portion 126d against which the separating claw 124 abuts.

The supporting member 127 is formed with a U-shaped groove 127a (or a slot) in which the spindle B124d of the separating claw 124 is movably supported, a cam slot 127b engaged by the engagement pin 128, and a restraining portion 127c on which the resilient member 125 is restrained. The stoppers 129 are mounted on the opposite ends of the engagement pin 128.

With the above-described construction, the separating claw 124 is pivotally moved in a counterclockwise direction as viewed in FIG. 2 about the spindle B124d by the biasing force of the resilient member 125, and the separating portion 124a of the separating claw 124 abuts against the surface of the heating roller 119.

Also, the spindle 124d abuts against the bottom of the U-shaped groove 127a of the supporting member 127 by the component force (the leftwardly obliquely downward direction in FIG. 2) of the biasing force of the resilient member 125, whereby the position of the separating claw 124 is kept.

On the other hand, the guide member 126 is pivotally moved in a counterclockwise direction about the spindle 124c of the separating claw 124 by gravity and the weight of the engagement pin 128, but the engagement pin 128 inserted in the guide member 126 abuts against the right end portion of the cam slot 127b of the supporting member 127 as viewed in FIG. 2, whereby the position of the guide member 126 is kept.

Accordingly, the separating claw 124 and the guide member 126 are kept partly protruded from the cut-away 121a of the upper separation guide 121, and can guide the recording sheet P separated from the heating roller 119 by the separating portion 124a of the separating claw 124 to the pair of fixing and discharge rollers 123 downstream thereof.

The operation of the sheet separating apparatus 117 will now be described with reference to FIGS. 5 and 6.

The recording sheet P to which the unfixed toner image has been transferred is conveyed while being nipped between and heated by the heating roller 119 and the pressure roller 120, but the recording sheet P after heated becomes greatly curled and thus, jam is liable to occur in the downstream conveying path.

Usually, the main body of the apparatus is designed to be stopped by sheet detecting means (not shown) when jam occurs immediately downstream of the fixing apparatus.

Figure 5:
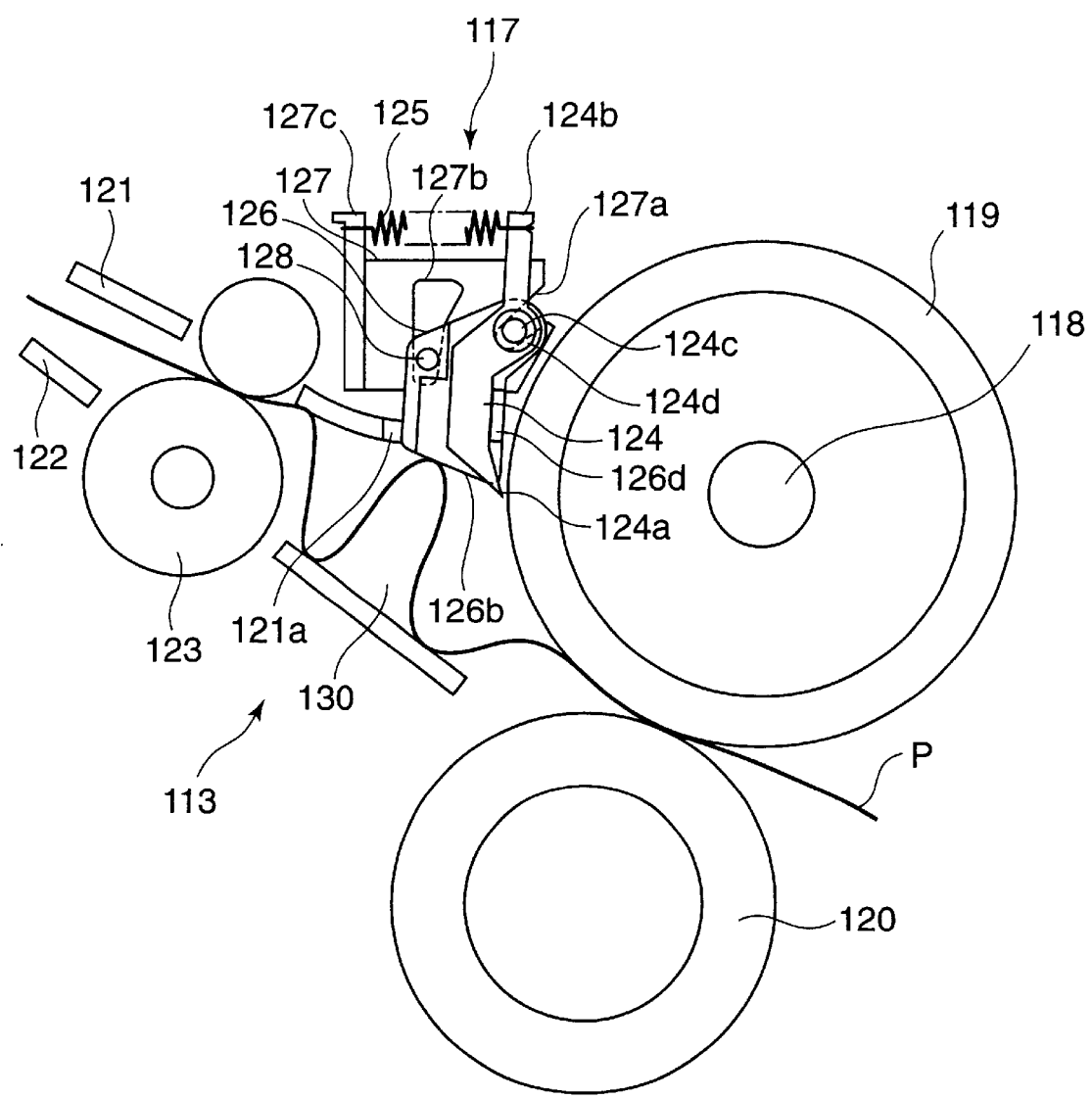
FIG. 5 is a view for illustrating the operation of the recording material separating apparatus in the first embodiment of the present invention.

However, the heating roller 119 and the pressure roller 120 which are great in inertia cannot be immediately stopped from rotating and therefore, as shown in FIG. 5, the recording sheet P becomes bellows-shaped in the sheet conveying path 130 formed by the upper separation guide 121 and the lower separation guide 122.

Thereupon, this bellows-shaped recording sheet P abuts against the guide portion 126b of the guide member 126. This abutting force is very great as compared with the weight of the guide member 126 and therefore, the guide member 126 is raised upwardly. The guide member 126 is supported by the spindle A124c coaxial with the spindle B124d of the separating claw 124 and therefore, when the guide member 126 is moved, the separating claw 124 is also moved.

Accordingly, the spindle B124d of the separating claw 124 is moved upwardly along the U-shaped groove 127a of the supporting member 127 and therefore, the guide member 126 and the separating claw 124 are both moved rightwardly obliquely upwardly as viewed in FIG. 5. On the other hand, when the guide member 126 is moved rightwardly obliquely upwardly as viewed in FIG. 5, the engagement pin 128 inserted in the guide member 126 abuts against the right end portion of the cam slot 127b formed in the supporting member 127. The shape of the cam slot 127b is designed such that as the guide member 126 is moved along the U-shaped groove 127a with the separating claw 124, the guide member 126 is pivotally moved in a clockwise direction about the spindle A124c. When the guide member 126 is moved by a predetermined amount, the separating claw abutting portion 126d of the guide member 126 abuts against the separating claw 124, which is thus pivotally moved in a clockwise direction about the spindle B124d against the biasing force of the resilient member 125. That is, in operative association with the movement of the guide member 126, the separating portion 124a of the separating claw 124 is spaced apart from the surface of the heating roller 119.

Figure 6:
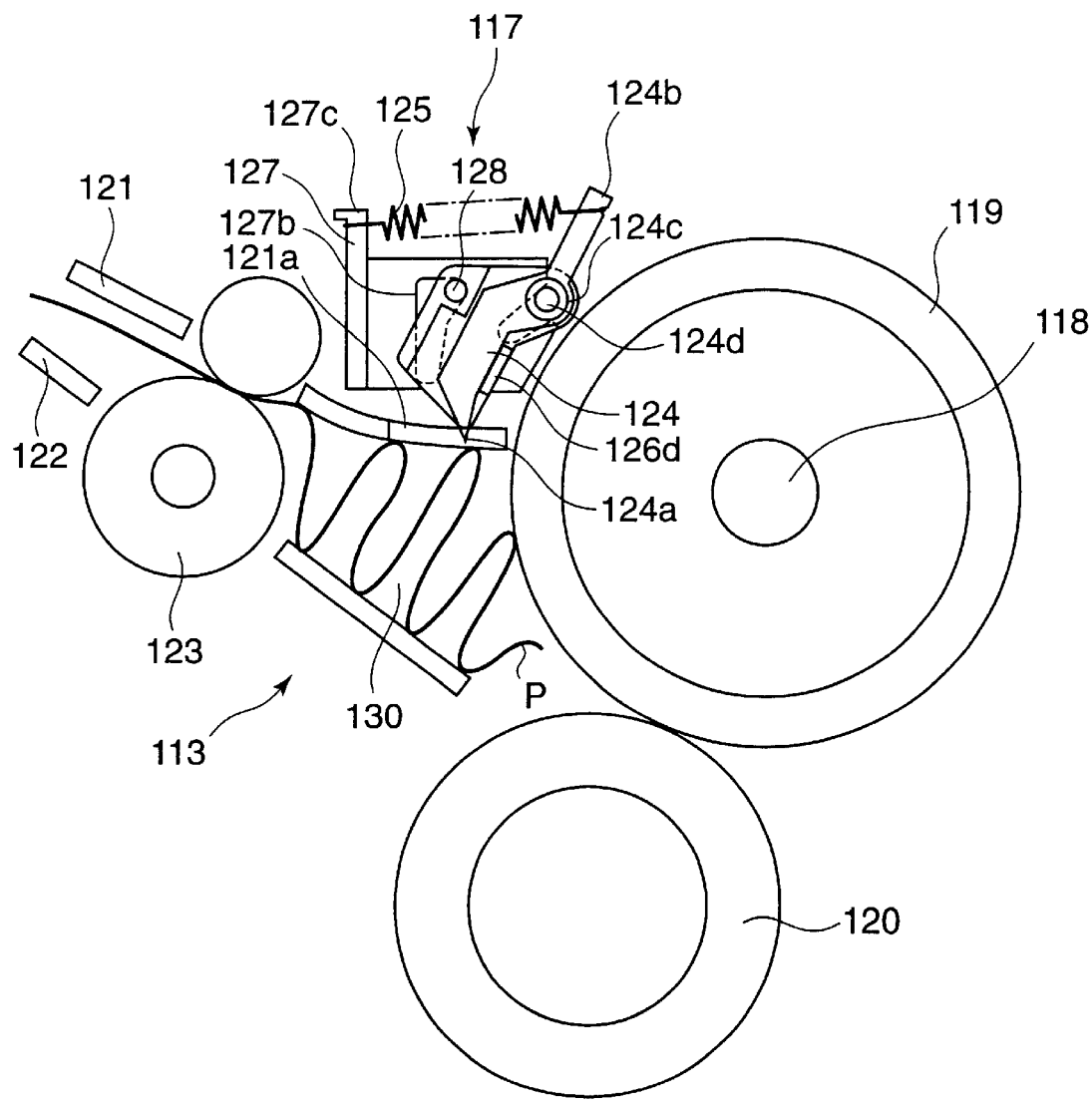
FIG. 6 is a view for illustrating the operation of the recording material separating apparatus in the first embodiment of the present invention.

Thereafter, the recording sheet P is conveyed until the heating roller 119 and the pressure roller 120 are completely stopped, and as shown in FIG. 6, the recording sheet P further folded into a plurality in the sheet conveying path 130 becomes jammed. At this time, the guide member 126 and the separating claw 124 are raised by the folded recording sheet P and are retracted from the sheet conveying path 130.

Consequently, according to the present embodiment, even if bellows jam occurs, the separating claw 124 does not receive the excessively great abutting pressure of the recording sheet and the separating portion 124a is spaced apart from the surface of the heating roller 119 and therefore, the surface of the roller can be prevented from being injured. Also, the separating portion 124a at the tip end of the separating claw 124 is retracted from the sheet conveying path 130 and therefore, the bellows-shaped recording sheet P can be hampered by the upper separation guide 121 from damaging the separating portion 124a.

By changing the shape of the right end portion of the cam slot 127b formed in the supporting member 127, the rotation angle relative to the amount of movement of the separating claw 124 along the U-shaped groove 127a can be changed easily. Also, when with the movement of the guide member 126, the spindle 124d of the separating claw 124 is moved upwardly along this groove, the separating portion 124a of the separating claw 124 is not spaced apart from the heating roller 119 until the separating claw abutting portion 126d of the guide member 126 abuts against the separating claw 124, and the separating portion 124a is moved upwardly along the surface of the heating roller 119. The shape of the U-shaped groove 127a formed in the supporting member 127 is designed such that to whatever position the spindle 124d of the separating claw 124 may be moved, it is without fail located on the heating roller side relative to the tangent on the separating portion 124a (the roller abutting portion) and therefore, it never happens that the separating portion 124a of the separating claw 124 eats into the heating roller.

When the main body of the apparatus is completely stopped and the recording sheet P stagnating in the sheet conveying path 130 is removed, the guide member 126 and the separating claw 124 are restored to their initial positions shown in FIG. 2 by the action of the resilient member 125.

Figure 7:
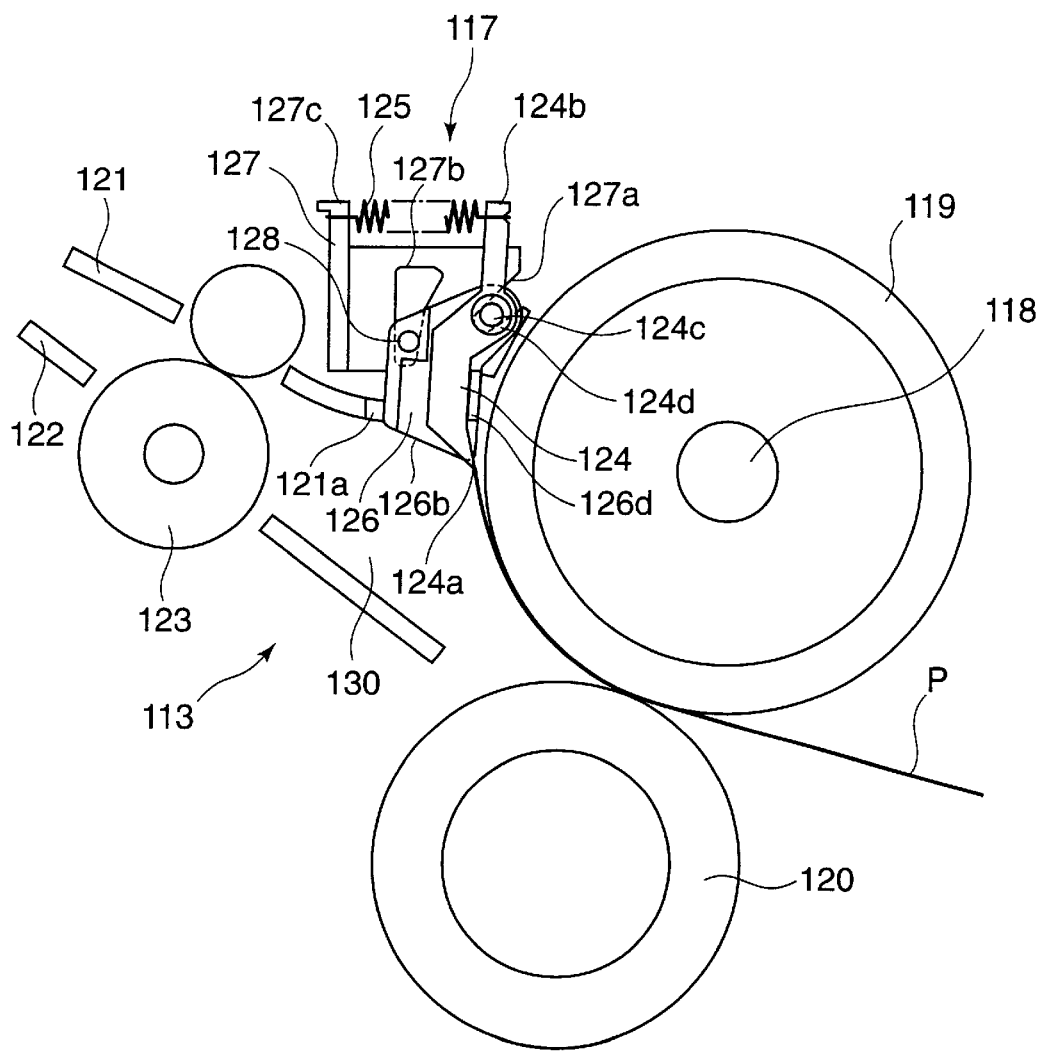
FIG. 7 is a view for illustrating the operation of the recording material separating apparatus in the first embodiment of the present invention.

Also, when as shown in FIG. 7, the separation of the leading end of the recording sheet P is not normally effected, the separating claw 124 is raised upwardly by the abutting force of the recording sheet P. When the separating claw 124 is moved upwardly along the U-shaped groove 127a, the guide member 126 is also moved and like the above-described action, the separating portion 124a of the separating claw 124 is spaced apart from the surface of the heating roller 119 and therefore, the heating roller can be prevented from being injured.

Figure 8:
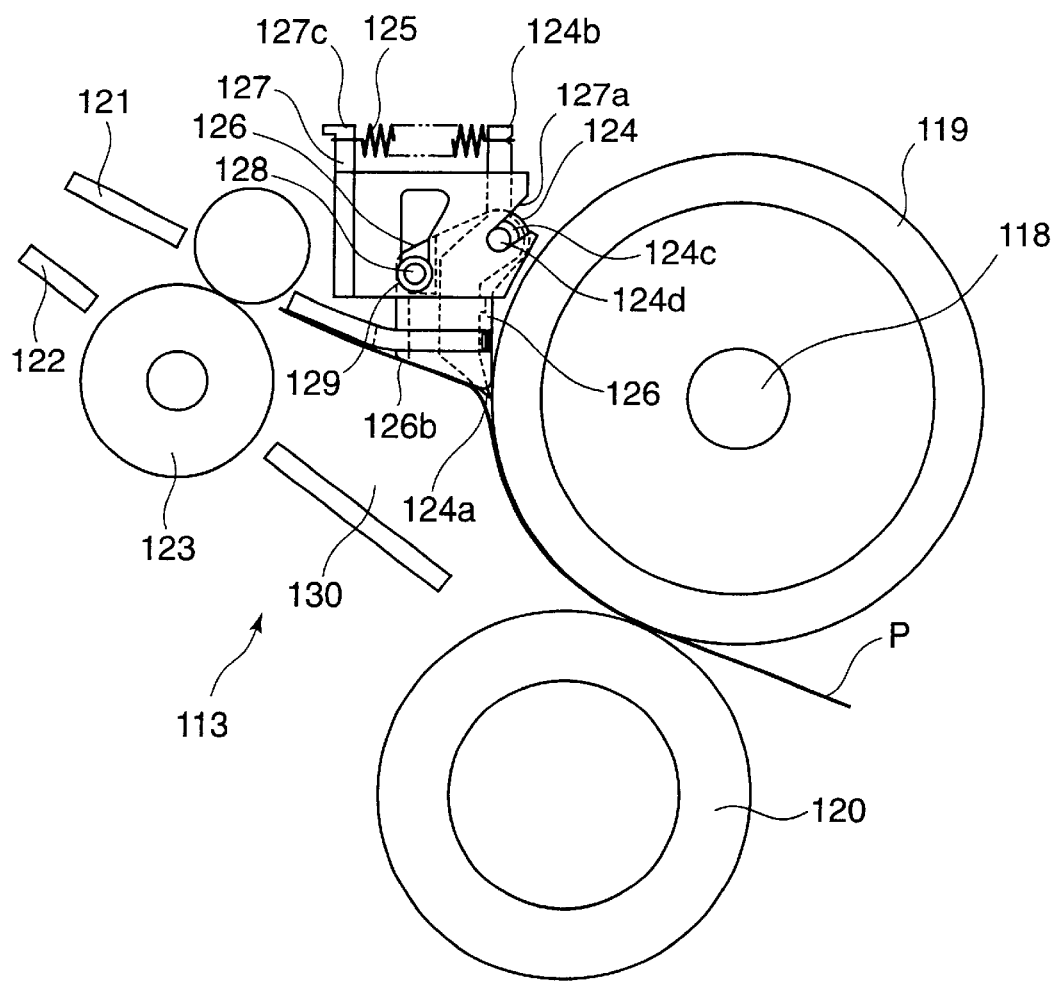
FIG. 8 is a view for illustrating the operation of the recording material separating apparatus in the first embodiment of the present invention.

Further, as shown in FIG. 8, the recording sheet P is conveyed while being separated from the heating roller by the separating claw 124 and therefore, it abuts against the guide member 126 or the separating claw 124 until its leading end is nipped between and conveyed by the pair of fixing and discharge rollers 123. Particularly when a pattern of high print percentage is printed on the printed surface (the upper surface as viewed in the figure) of the recording sheet P, the problem of the printed surface rubbing against the separating claw to cause a bad image is liable to arise. According to the present embodiment, however, the presence of the guide member 126 which is wide as compared with the separating claw 124 can mitigate the linear pressure with which the recording sheet P abuts, and it becomes difficult for bad images to occur.

Also, most of the separating claw 124 except the separating portion 124a is covered with the guide member 126 and therefore, the abutting pressure of the recording sheet P separated from the heating roller 119 against the separating claw 124 is mitigated. That is, the abutting pressure of the separating claw 124 against the heating roller 119 when the recording sheet P is being separated is mitigated and therefore, the wear of the surface of the roller can be mitigated and it becomes possible to lengthen the life of the heating roller 119, i.e., the life of the fixing apparatus 113.

While in the present embodiment, a sheet separating apparatus has been described, a plurality of sheet separating apparatuses 117 may be arranged in the axial direction of the heating roller 119 in conformity with the width of the recording sheet used. The sheet separating apparatuses may also be arranged on the pressure roller 120 side, or may be arranged on both sides of the heating roller 119 and the pressure roller 120. Also, while a roller fixing device having a heating roller is used as the fixing apparatus 113 in the present embodiment, this is not restrictive, but use may be made of a SURF (surface rapid fusing) fixing device using film or a fixing device using an induction heating member. Further, the fixing apparatus is not restrictive, but use may be made of a construction comprising a combination of an apparatus for conveying sheet-shaped articles and the sheet separating apparatus 117 of the present embodiment.

(Second Embodiment)

A sheet separating apparatus 133 which is a recording material separating apparatus according to a second embodiment of the present invention will now be described with reference to FIGS. 9 and 10. In this embodiment, members similar in construction to those in the first embodiment are given the same reference characters and need not be described.

Figure 9:
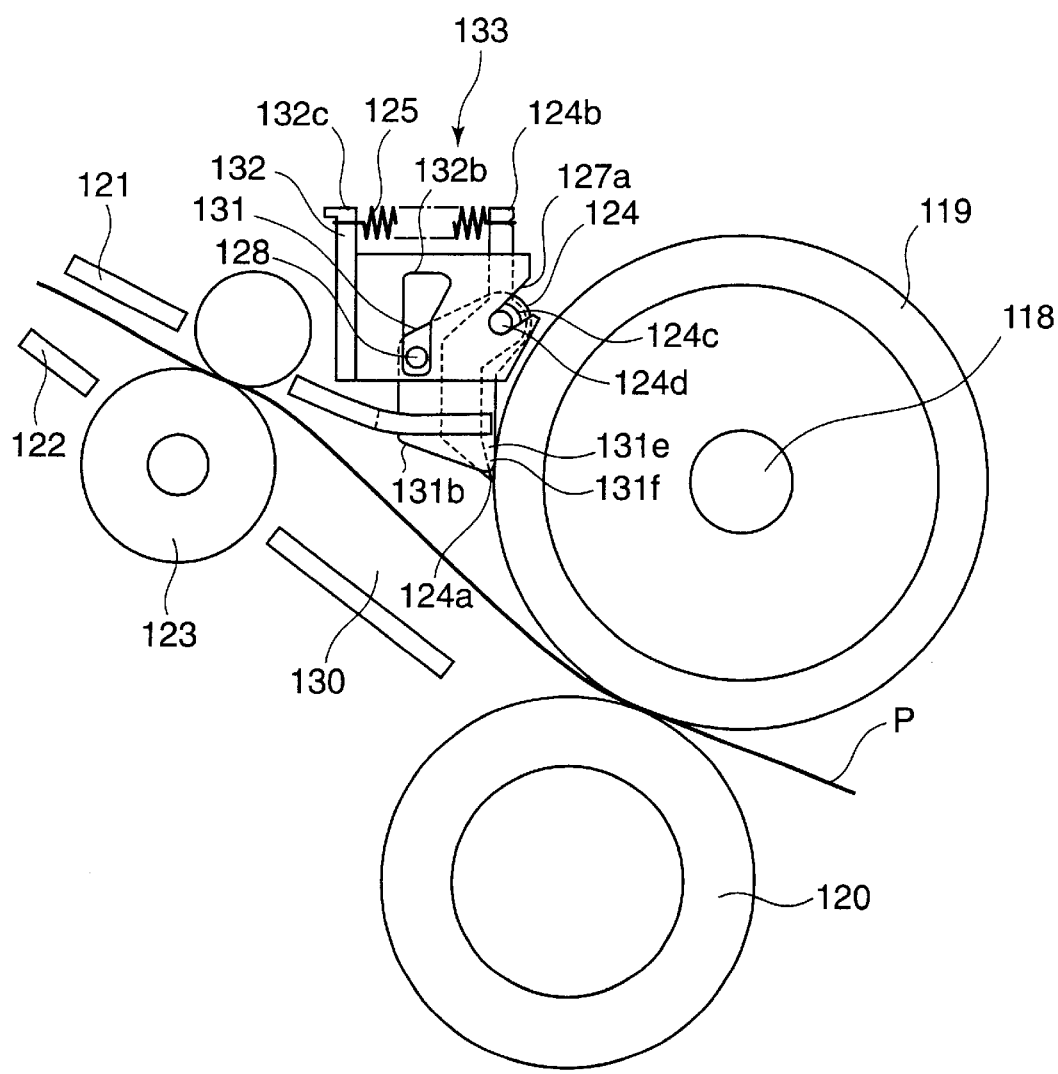
FIG. 9 is a typical cross-sectional view schematically showing the construction of a fixing apparatus provided with a recording material separating apparatus according to a second embodiment of the present invention.

As shown in FIG. 9, the sheet separating apparatus 133 is provided with a guide member 131 and a supporting member 132 differing in shape from those in the above-described first embodiment.

The guide member 131 is formed with a roller abutting portion 131e. Also, the supporting member 132 is formed with a cam slot 132b.

The guide member 131 is pivotally moved in a counter-clockwise direction about the spindle A124c of the separating claw 124 by its own weight and the weight of the engagement pin 128 inserted therein. The roller abutting portion 131e of the guide member 131 abuts against the heating roller 119, whereby the position thereof is kept. At this time, the engagement pin 128 is adapted not to contact with the right end portion of the cam slot 132b of the supporting member 132.

Figure 10:
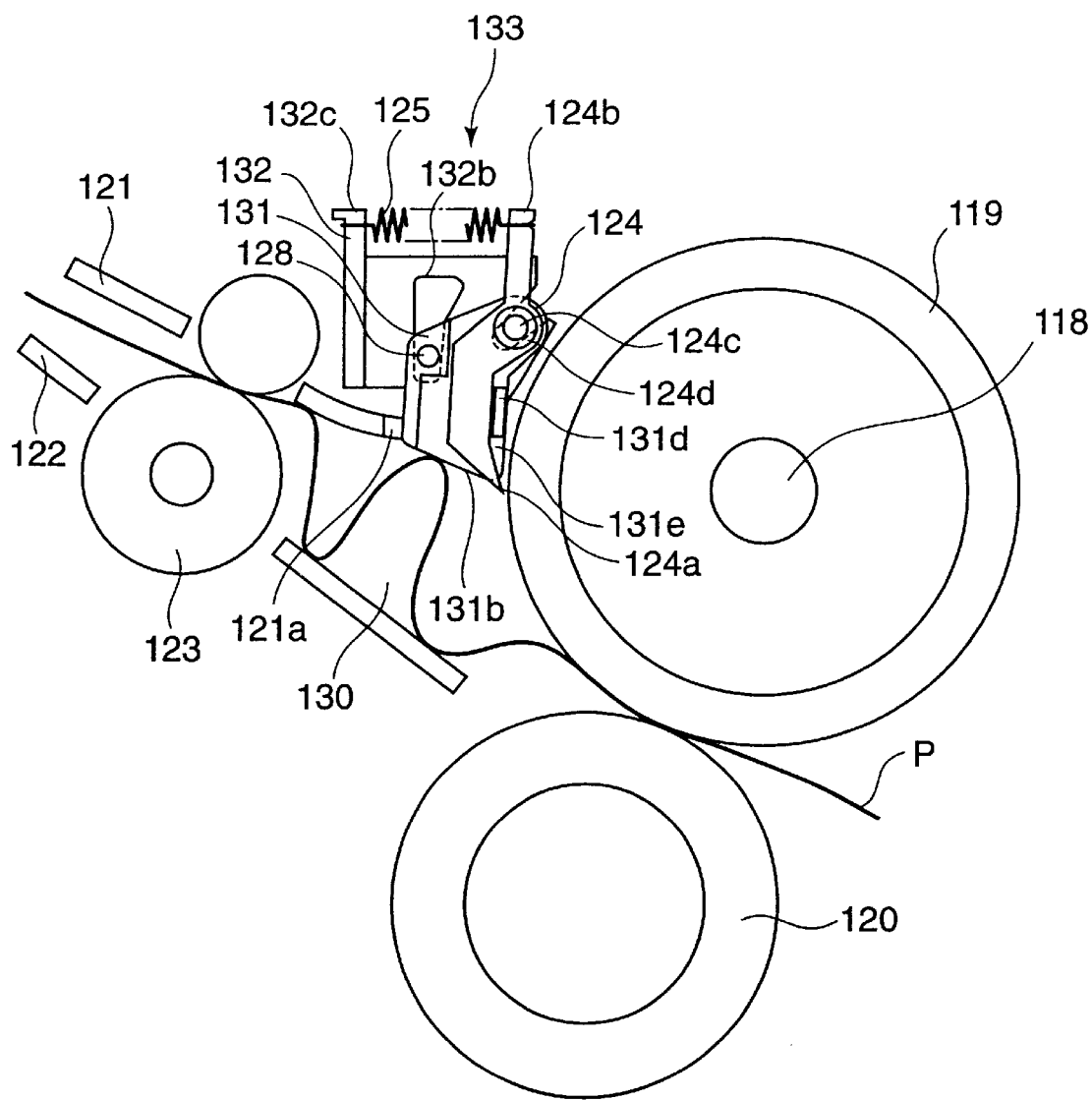
FIG. 10 is a view for illustrating the operation of the recording material separating apparatus in the second embodiment of the present invention.

Next, when bellows jam occurs as shown in FIG. 10, a wavy recording sheet P abuts against the guide portion 131b of the guide member 131 as in the above-described first embodiment. Since this abutting force is very great as compared with the weight of the guide member 131, the guide member 131 is raised upwardly.

The guide member 131 is pivotally supported on the spindle A124c coaxial with the spindle B124d of the separating claw 124 and therefore, when the spindle B124d of the separating claw 124 is moved rightwardly obliquely upwardly along the U-shape groove 132a of the supporting member 132, the separating claw 124 is also moved rightwardly obliquely upwardly as viewed in FIG. 10.

On the other hand, the guide member 131 is pivotally moved in a clockwise direction about the spindle A124c because the engagement pin 128 inserted therein is moved upwardly while contacting with the right end portion of the cam slot 132b formed in the supporting member 132.

Thereupon, the separating claw abutting portion 131d of the guide member 131 abuts against the separating claw 124, which is thus pivotally moved in a clockwise direction about the spindle B124d against the biasing force of the resilient member 125. That is, in operative association with the movement of the guide member 131, the separating portion 124a of the separating claw 124 is spaced apart from the surface of the heating roller 119.

Thereafter, when the recording sheet P is further folded into a plurality and becomes jammed, the guide member 131 and the separating claw 124 are retracted to above the upper separation guide 121 as in the above-described first embodiment. When the bellows-shaped recording sheet P abuts against the guide member 131, an excessively great load is applied to the roller abutting portion 131e of the guide member against the heating roller 119, but the surface of the roller is not injured because the roller abutting portion 131e is not sharp as compared with the separating portion 124a of the separating claw 124.

In such a construction, the positional accuracy of the tip end portion 131f of the guide member 131 and the separating portion 124a of the separating claw 124 is improved and therefore, it becomes possible to reliably separate the recording sheet P from the heating roller 119.

(Third Embodiment)

A sheet separating apparatus 140 which is a recording material separating apparatus according to a third embodiment of the present invention will now be described with reference to FIGS. 11 to 13. In this embodiment, members similar in construction to those in the first embodiment are given the same reference characters and need not be described.

Figure 11:
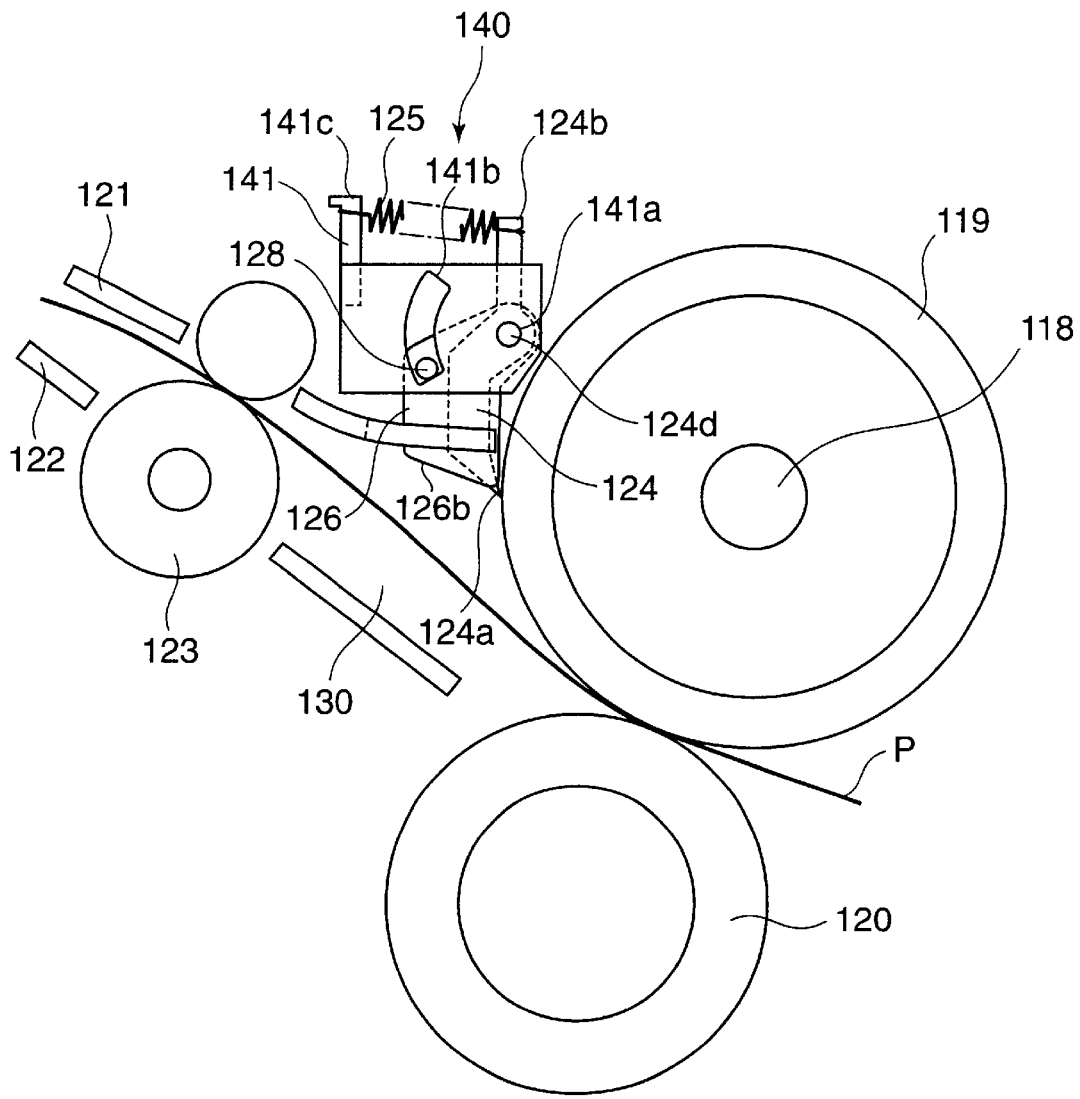
FIG. 11 is a typical cross-sectional view schematically showing the construction of a fixing apparatus provided with a recording material separating apparatus according to a third embodiment of the present invention.

As shown in FIG. 11, the sheet separating apparatus 140 is provided with a supporting member 141 differing in shape from that in the above-described first embodiment.

The supporting member 141 is formed with a fulcrum 141a formed with an aperture which provides the pivotal movement fulcrum of the separating claw 124, and an arcuate slot 141b in which the engagement pin 128 is restrained. That is, the guide member 126 is pivotally movable in a clockwise direction as viewed in FIG. 11 about the fulcrum 141a.

Usually, the guide member 126 is pivotally moved in a counter-clockwise direction by gravity and the weight of the engagement pin 128 inserted therein, and the position thereof is kept with the engagement pin 128 being in contact with the lower end of the slot 141b of the supporting member 141.

The operation of the sheet separating apparatus 140 will now be described with reference to FIGS. 12 and 13.

Figure 12:
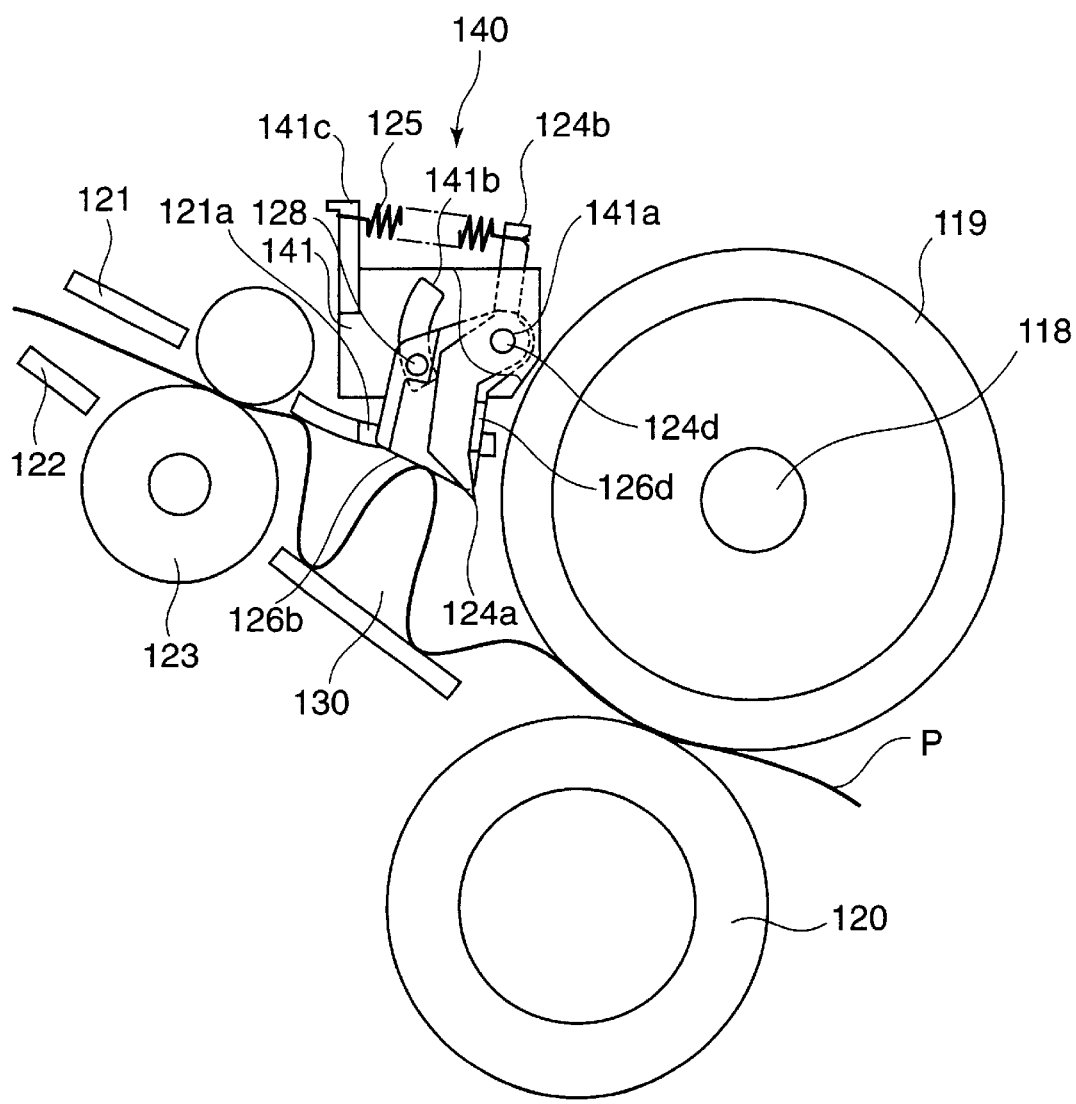
FIG. 12 is a view for illustrating the operation of the recording material separating apparatus in the third embodiment of the present invention.

When bellows jam occurs as shown in FIG. 12, the bellows-shaped recording sheet P abuts against the guide portion 126b of the guide member 126. This abutting force is very great as compared with the weight of the guide member 126, and since the guide member 126 is pivotally supported on the spindle A124c coaxial with the spindle B124d of the separating claw 124, the guide member 126 is pivotally moved in a clockwise direction about the fulcrum 141a.

Thereupon, the separating claw abutting portion 126d of the guide member 126 abuts against the separating claw 124, which is thus pivotally moved in a clockwise direction about the spindle B124d against the biasing force of the resilient member 125. That is, in operative association with the movement of the guide member 126, the separating portion 124a of the separating claw 124 is spaced apart from the surface of the heating roller 119.

Figure 13:
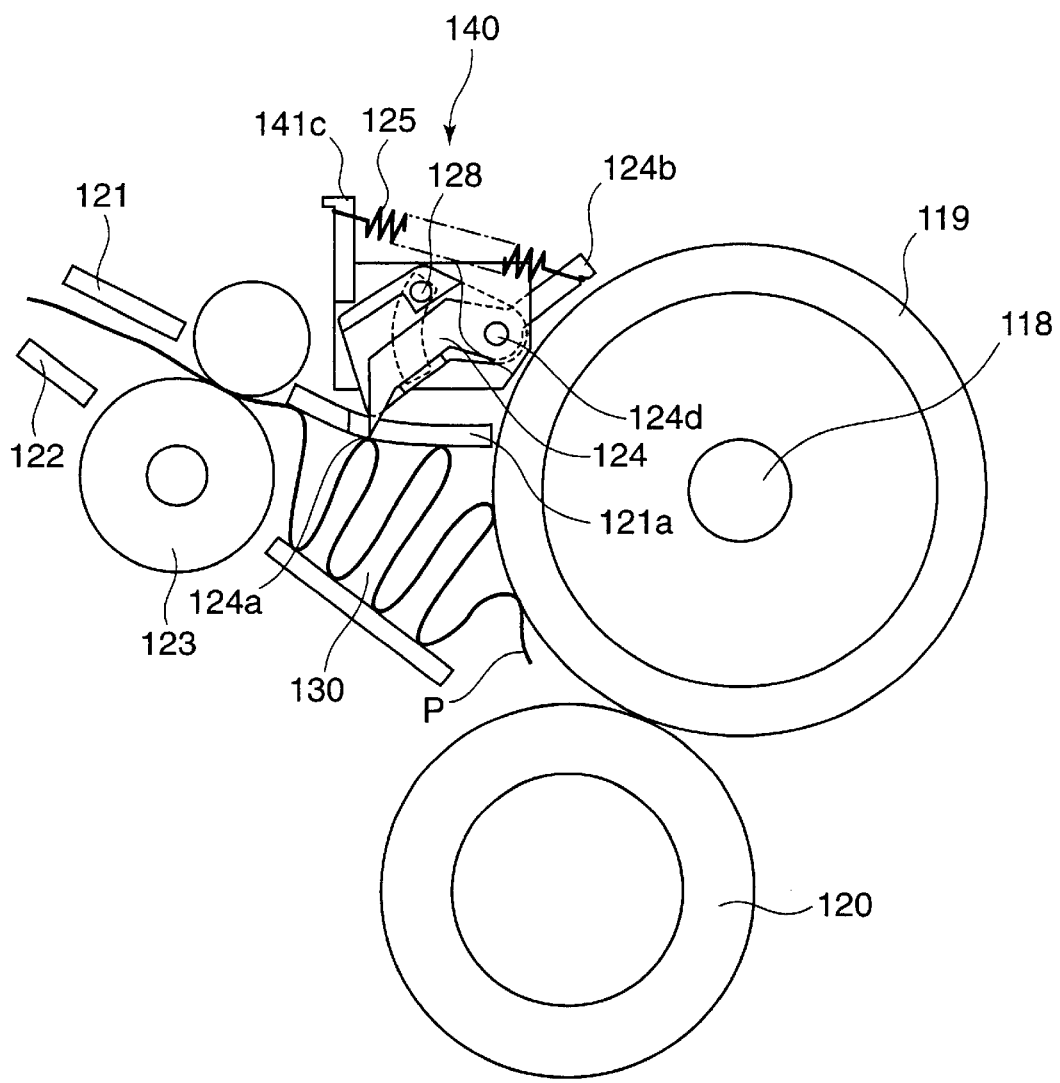
FIG. 13 is a view for illustrating the operation of the recording material separating apparatus in the third embodiment of the present invention.

Thereafter, the recording sheet P is conveyed until the heating roller 119 and the pressure roller 120 are completely stopped, and as shown in FIG. 13, the recording sheet P further folded into a plurality becomes jammed in the sheet conveying path 130. At this time, the guide member 126 and the separating claw 124 are raised by the folded recording sheet P and are retracted to above the upper separation guide 121.

(Fourth Embodiment)

A sheet separating apparatus 150 which is a recording material separating apparatus according to a fourth embodiment of the present invention will now be described with reference to FIGS. 14 and 15. In this embodiment, members similar in construction to those in the first embodiment are given the same reference characters and need not be described.

Figure 14:
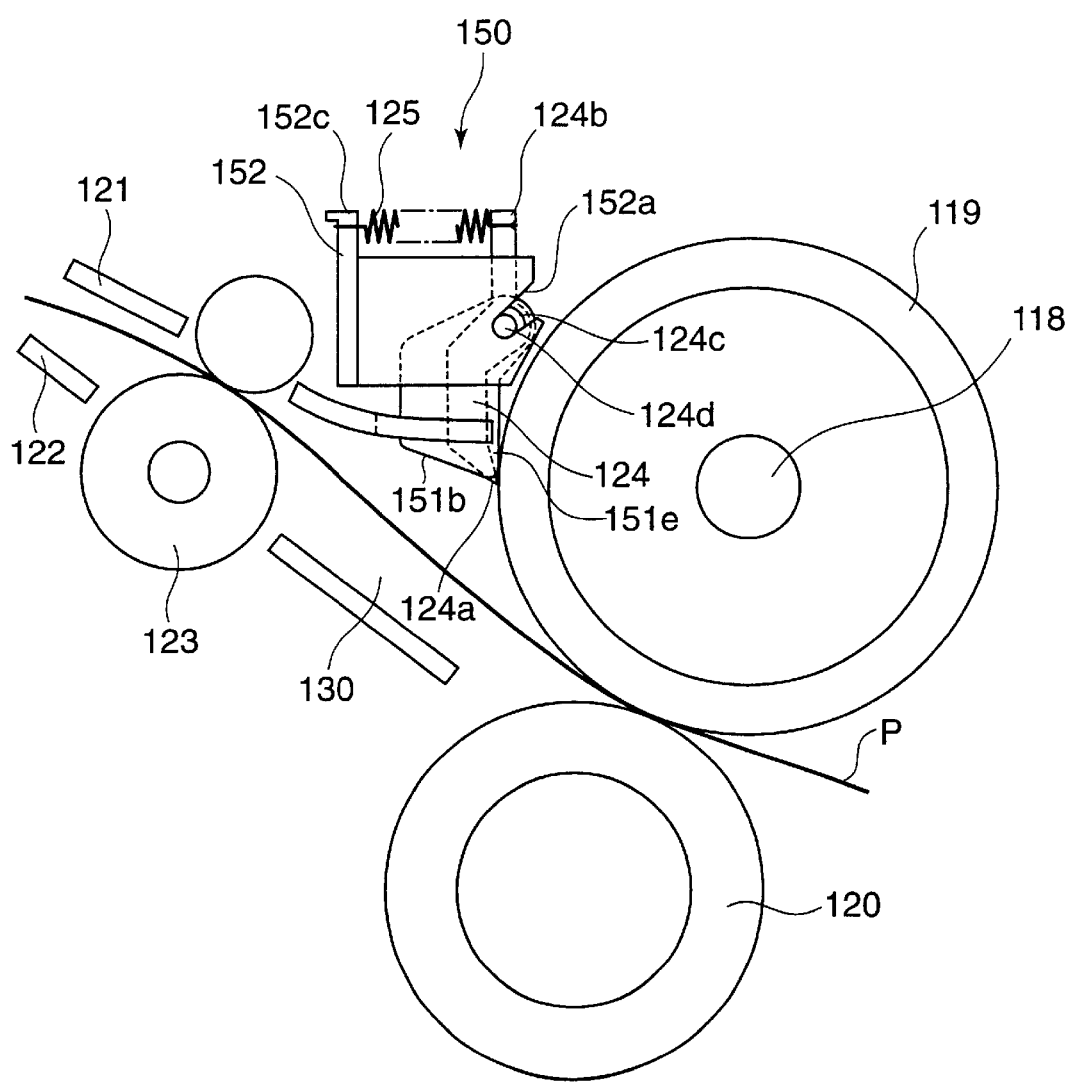
FIG. 14 is a typical cross-sectional view schematically showing the construction of a fixing apparatus provided with a recording material separating apparatus according to a fourth embodiment of the present invention.

As shown in FIG. 14, the sheet separating apparatus 150 is provided with a guide member 151 and a supporting member 152 differing in shape from those in the above-described first embodiment.

The guide member 151 is formed with a roller abutting portion 151e abutting against the heating roller 119. Also, the supporting member 152 is formed with a U-shaped groove 152a (or a U-shaped aperture) in which the spindle B124d of the separating claw 124 is movably supported.

The guide member 151 is pivotally supported on the spindle A124c coaxial with the spindle B124d of the separating claw. The guide member 151 is pivotally moved in a counter-clockwise direction as viewed in FIG. 14 about the spindle A124c, and keeps its position with the roller abutting portion 151e abutting against the surface of the heating roller 119.

Figure 15:
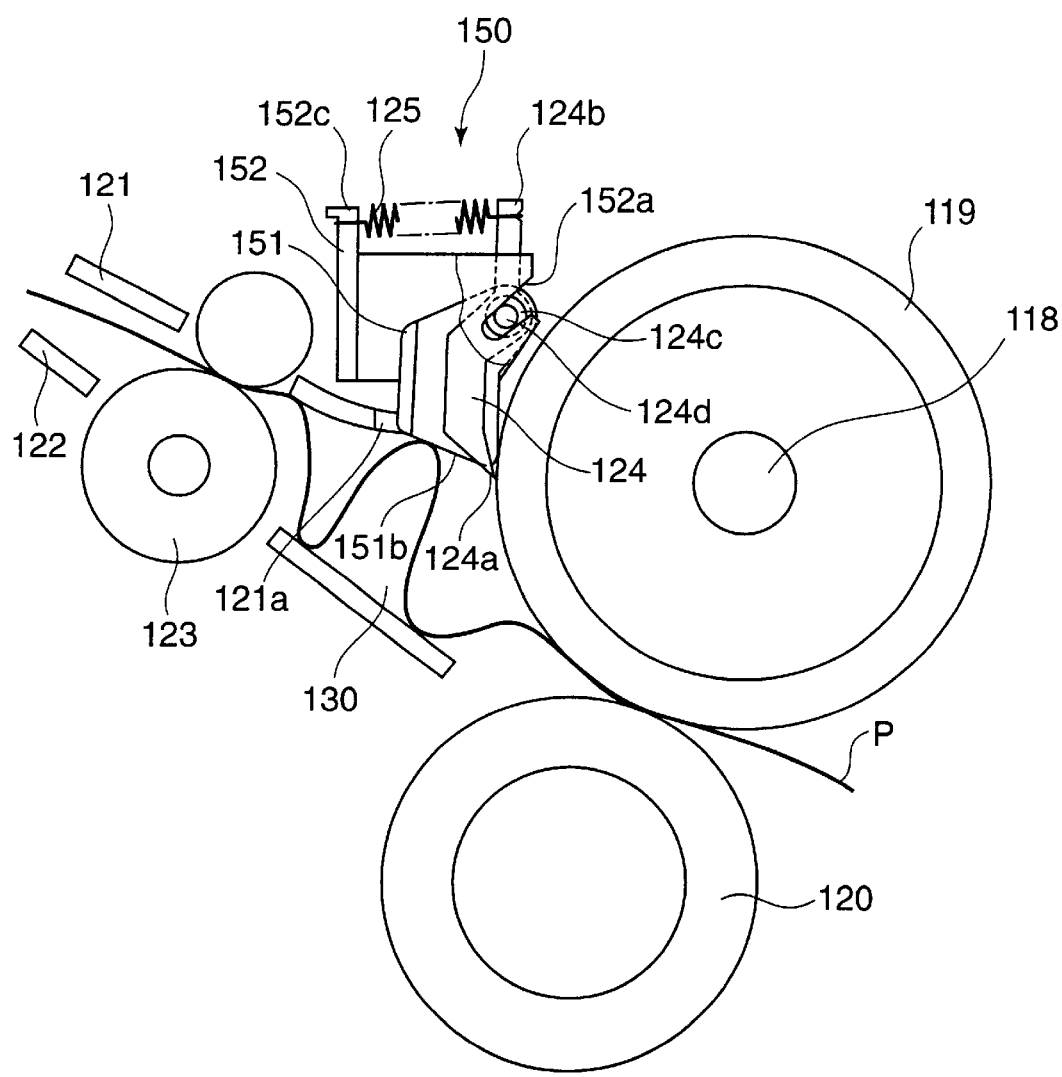
FIG. 15 is a view for illustrating the operation of the recording material separating apparatus in the fourth embodiment of the present invention.

Next, when bellows jam occurs as shown in FIG. 15, the wavy recording sheet P abuts against the guide portion 151b of the guide member 151 as in the above-described first embodiment. This abutting force is very great as compared with the gravity of the guide member 151 and the component force of the biasing force of the resilient member 125 and therefore, the guide member 151 and the separating claw 124 are both moved rightwardly obliquely upwardly along the U-shaped groove 152a of the supporting member 152.

Thereafter, when the recording sheet P is further folded into a plurality and becomes jammed, the guide member 151 and the separating claw 124 are completely retracted to above the upper separation guide 121 as in the above-described first embodiment. In the present embodiment, the separating portion 124a of the separating claw 124 is not spaced apart from the heating roller 119, but yet the separating portion 124a is retracted to above the sheet conveying path 130 before the bellows-shaped recording sheet P abuts against the separating claw and therefore, the heating roller 119 can be prevented from being injured.

As described above, according to the first to fourth embodiments, when the jam of the recording sheet occurs downstream of the fixing apparatus, the bellows-shaped sheet abuts against the guide member before it abuts against the separating claw, and the guide member is retracted, and in operative association with the retraction, the tip end of the separating claw is spaced apart from the heating roller and therefore, it becomes possible to prevent the surface of the roller from being injured by the separating claw.

Also, since the tip end of the separating claw is retracted from the sheet conveying path, the tip end of the separating claw is not damaged by the abutting of the bellows-shaped recording sheet and therefore, the separating performance of the sheet can be maintained.

Further, when the separation of the leading end of the recording sheet is not normally effected, even if an excessive load by the sheet is applied to the separating claw, the separating claw is spaced apart from the heating roller and thus, it is possible to prevent the roller from being injured by the separating claw.

Also, the recording sheet separated from the roller by the separating claw is guided by the guide member wider than the width of the separating claw and thus, linear pressure can be mitigated and it becomes possible to prevent the occurrence of a bad image.

Further, the abutting pressure against the separating claw when the recording sheet separated from the roller by the separating claw is conveyed is mitigated and therefore, the wear of the surface of the roller by the separating claw can be mitigated, and it becomes possible to lengthen the life of the roller.

Also, there can be supplied a sheet separating apparatus which is of an easy construction and therefore is inexpensive and high in reliability as compared with the prior art.

(Fifth Embodiment)

A sheet separating apparatus 160 which is a recording material separating apparatus according to a fifth embodiment of the present invention will now be described with reference to FIGS. 16 to 22. In this embodiment, members similar in construction to those in the first embodiment are given the same reference characters and need not be described.

The sheet separating apparatus 160 according to the present embodiment is comprised of a separating claw 124 which is a separating member, a resilient member 125 which is a biasing member, a guide member 161, a supporting member 162, an engagement pin 128, stoppers 129, etc.

A separating portion 124a for separating the heated and fixed recording sheet P from the heating roller 119 is provided on one end of the separating claw 124, and a restraining portion 124b for restraining the resilient member 125 and a guide portion 124e for guiding the separated recording sheet are provided on the other end of the separating claw 124. Also, a spindle A124c and a spindle B124d are formed coaxially with each other.

The guide member 161 is formed with an aperture 161a pivotally supported on the spindle A124c of the separating claw 124, a guide portion 161b for guiding the recording sheet separated by the separating claw 124 to the upper separation guide 121, an aperture 161c into which the engagement pin 128 is inserted, and a separating claw abutting portion 161d against which the separating claw 124 abuts.

The supporting member 162 is formed with a U-shaped groove 162a (or a slot) in which the spindle B124d of the separating claw 124 is movably supported, a cam slot 162b engaged by the engagement pin 128, and a restraining portion 162c on which the resilient member 125 is restrained. The stoppers 129 are mounted on the opposite ends of the engagement pin 128.

Figure 16:
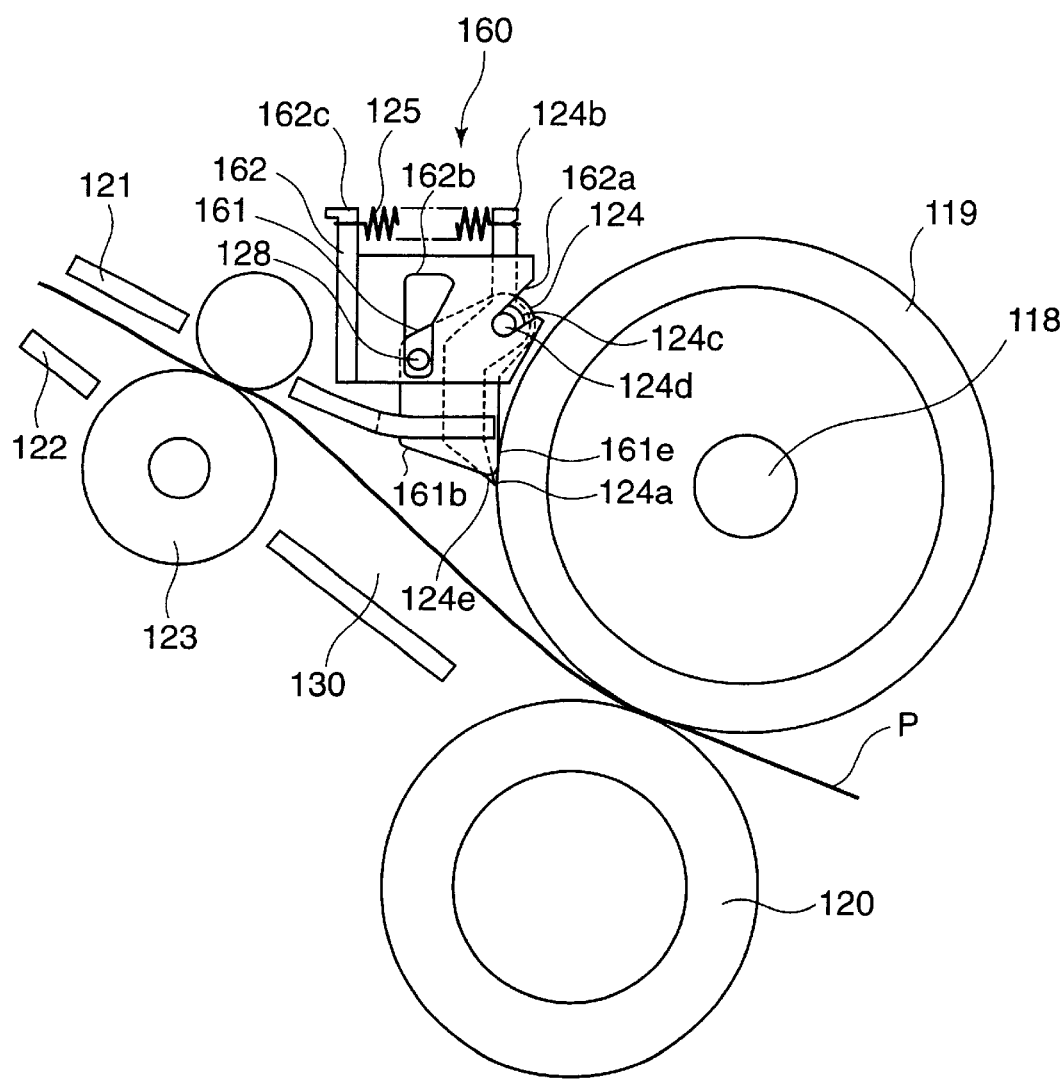
FIG. 16 is a typical cross-sectional view schematically showing the construction of a fixing apparatus provided with a recording material separating apparatus according to a fifth embodiment of the present invention.
Figure 17:
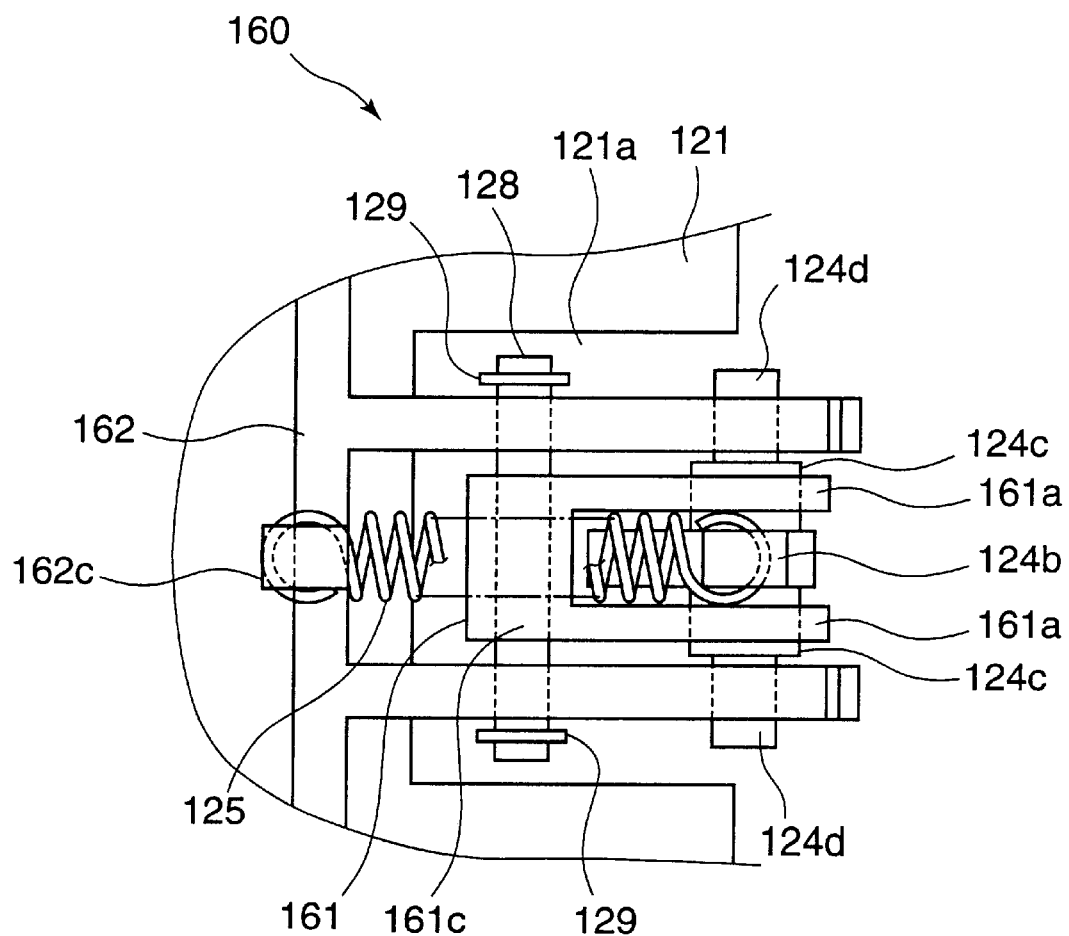
FIG. 17 is a top plan view of the recording material separating apparatus provided in the fixing apparatus of FIG. 16.
Figure 18:
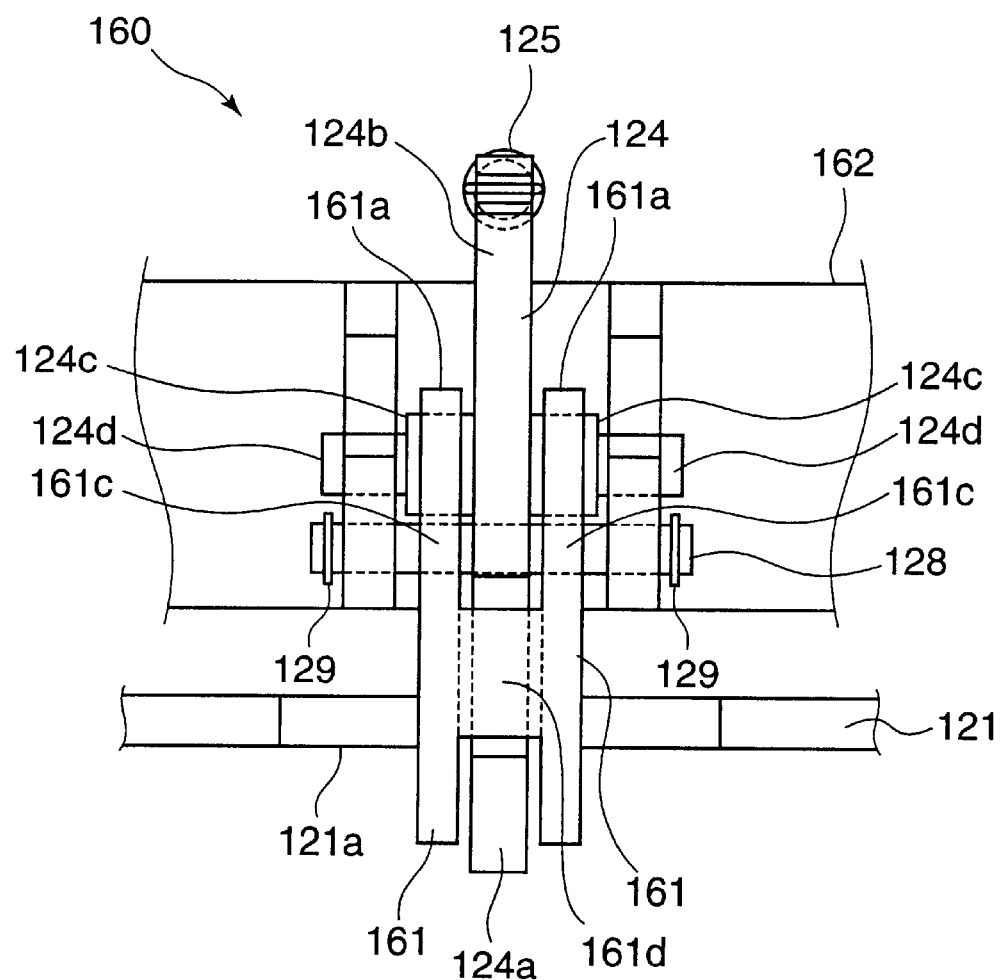
FIG. 18 is a right side view of the recording material separating apparatus provided in the fixing apparatus of FIG. 16.

With the above-described construction, the separating claw 124 is pivotally moved in a counterclockwise direction as viewed in FIG. 16 about the spindle B124d by the biasing force of the resilient member 125, and the separating portion 124a of the separating claw 124 abuts against the surface of the heating roller 119.

Also, the spindle B124d abuts against the bottom of the U-shaped groove 162a of the supporting member 162 by the component force (leftwardly obliquely downward as viewed in FIG. 16) of the biasing force of the resilient member 125, whereby the position of the separating claw 124 is kept.

On the other hand, the guide member 161 is pivotally moved in a counter-clockwise direction about the spindle A124c of the separating claw 124 by gravity and the weight of the engagement pin 128. The roller abutting portion 161e of the guide member 161 is formed, and abuts against the heating roller 119, whereby the position thereof is kept. At this time, the engagement pin 128 is adapted not to contact with the right end portion of the cam slot 162b of the supporting member 162.

The separating portion 124a of the separating claw 124 is of a sharp shape in order to peel the leading end of the sheet sticking on the heating roller 119. This sharp portion abuts against the heating roller 119 with predetermined pressure and therefore, if unexpected excessively great abutting pressure is applied to the separating claw 124, it will readily pierce the heating roller 119 or injure the heating roller 119. Also, the separating portion 124a of the separating claw 124 is liable to be damaged because it is sharp, and if it contacts with the heating roller 119 with excessively great abutting pressure or it is contacted by a jammed sheet and is damaged thereby, separation will not reliably be effected and jam will be caused.

The present embodiment is of a construction in which the roller abutting portion 161e of the guide member 161 abuts against the heating roller 119 and therefore, the positional relation between the guide member 161 and the separating portion 124a of the separating claw 124 can be kept good in accuracy. That is, the guide member 161 can be made as close as possible to the separating portion 124a of the separating claw 124 and therefore, most of the separating claw 124 can be covered. Also, the roller abutting portion 161e of the guide member 161 is of a smooth shape so as not to injure the surface of the roller even if it abuts against the heating roller 119 with excessively great abutting pressure.

Because of the construction as described above, the separating claw 124 and the guide member 161 keep themselves partly protruded from the cut-away 121a of the upper separation guide 121, and can guide the recording sheet P separated from the heating roller 119 by the separating portion 124a of the separating claw 124 to the pair of fixing and discharge rollers 123 on the downstream side.

The operation of the sheet separating apparatus 160 will now be described with reference to FIGS. 19 and 20.

The recording sheet P to which an unfixed toner image has been transferred is conveyed while being nipped between and heated by the heating roller 119 and the pressure roller 120, but the recording sheet P after heated becomes greatly curled and is liable to be jammed in the conveying path on the downstream side.

Usually, design is made such that when jam occurs immediately downstream of the fixing apparatus, the main body of the apparatus is stopped by sheet detecting means (not shown).

Figure 19:
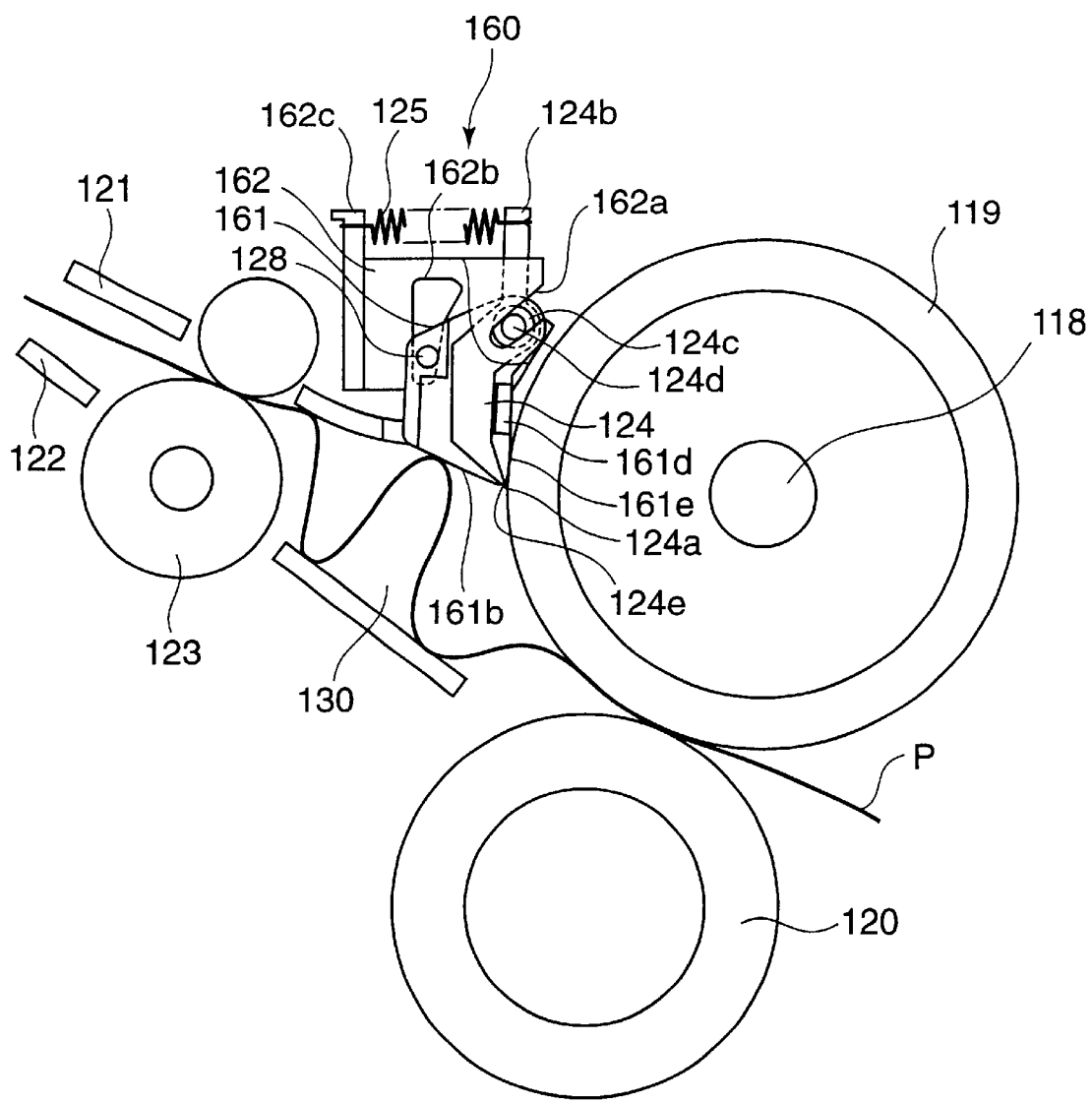
FIG. 19 is a view for illustrating the operation of the recording material separating apparatus in the fifth embodiment of the present invention.

However, the heating roller 119 and the pressure roller 120 which are great in inertia cannot immediately stop rotation and therefore, the recording sheet P becomes bellows-shaped in the sheet conveying path 130 formed by the upper separation guide 121 and the lower separation guide 122, as shown in FIG. 19.

Thereupon, this bellows-shaped recording sheet P abuts against the guide portion 161b of the guide member 161. Since this abutting force is very great as compared with the weight of the guide member 161, the guide member 161 is raised upwardly while the abutting portion 161e thereof is in contact with the surface of the heating roller 119. At this time, the roller abutting portion 161e of the guide member 161 abuts against the heating roller 119 with excessively great pressure, but does not injure the heating roller 119 because the roller abutting portion 161e is of a smooth shape. The guide member 161 is supported by the spindle A124c coaxial with the spindle B124d of the separating claw 124 and therefore, when the guide member 161 is moved, the separating claw 124 is also moved.

Accordingly, the spindle B124d of the separating claw 124 is moved upwardly along the U-shaped groove 162a of the supporting member 162 and therefore, the guide member 161 and the separating claw 124 are both moved rightwardly obliquely upwardly as viewed in FIG. 19. On the other hand, when the guide member 161 is moved rightwardly obliquely upwardly as viewed in FIG. 19, the engagement pin 128 inserted in the guide member 161 contacts with the right end portion of the cam slot 162b formed in the supporting member 162. The shape of the cam slot 162b is designed such that as the guide member 161 is moved along the U-shaped groove 162a with the separating claw 124, the guide member 161 is pivotally moved in a clockwise direction about the spindle A124c. When the guide member 161 is moved by a predetermined amount by the abutting of the sheet material, the separating claw abutting portion 161d of the guide member 161 abuts against the separating claw 124, which is thus pivotally moved in a clockwise rotation about the spindle B124d against the biasing force of the resilient member 125. That is, in operative association with the movement of the guide member 161, the separating portion 124a of the separating claw 124 is spaced apart from the surface of the heating roller 119.

Figure 20:
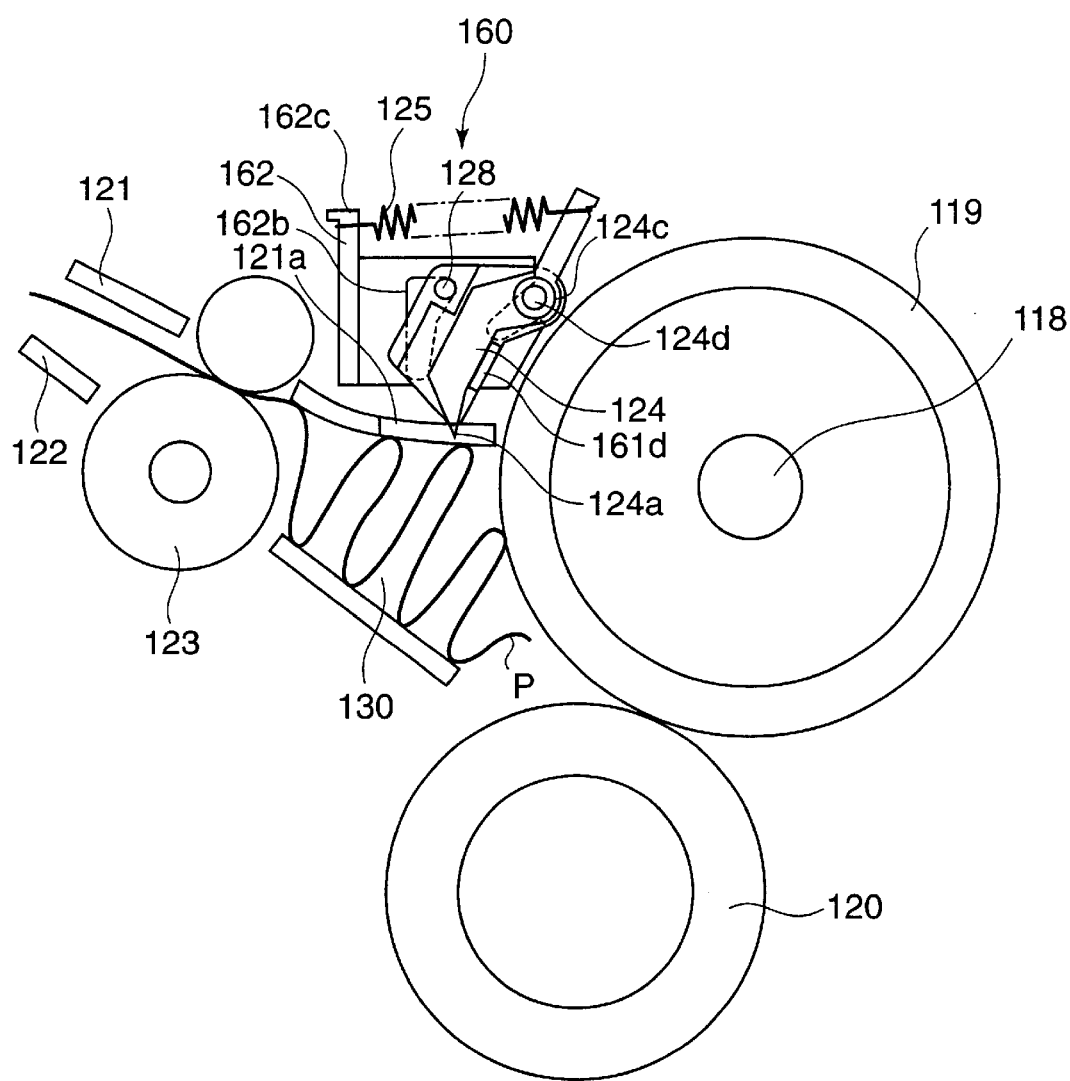
FIG. 20 is a view for illustrating the operation of the recording material separating apparatus in the fifth embodiment of the present invention.

Thereafter, the recording sheet P is conveyed until the heating roller 119 and the pressure roller 120 are completely stopped, and the recording sheet P further folded into a plurality becomes jammed in the sheet conveying path 130, as shown in FIG. 20. At this time, the guide member 161 and the separating claw 124 are raised by the folded recording sheet P, and are retracted from the sheet conveying path 130.

Consequently, design is made such that even if bellows jam occurs, almost all of the guide portion 124e of the separating claw 124 is covered with the guide member 161 and it is difficult for the recording sheet P to contact with the separating claw. Accordingly, the separating claw 124 becomes spaced apart from the surface of the heating roller 119 earlier than it contacts with the recording sheet and therefore, the surface of the heating roller 119 can be prevented from being injured.

Also, a portion of the guide member 116 is abutting against the heating roller 119 and therefore, the positional accuracy of the abutting portion 161e and the separating portion 124a of the separating claw 124 is improved and thus, it never happens that the leading end of the recording sheet P is caught by the roller abutting portion 161e of the guide member 161, and it becomes possible to prevent such problems as jam and the breakage of the leading end of the recording sheet.

Also, when with the movement of the guide member 161, the spindle 124d of the separating claw 124 is moved upwardly along the U-shaped groove 162a of the supporting member 162, the separating portion 124a of the separating claw 124 is not spaced apart from the heating roller 119 until the separating claw abutting portion 161d of the guide member 161 abuts against the separating claw 124, and the separating portion 124a is moved upwardly along the surface of the heating roller 119. The shape of the U-shaped groove 162a formed in the supporting member 162 is designed to be without fail located on the heating roller 119 side relative to the tangent on the separating portion 124a (the roller abutting portion) to whatever position the spindle 124d of the separating claw may be moved (designed to be free to escape from the heating roller 119) and therefore, it never happens that the separating portion 124a of the separating claw 124 eats into the heating roller 119.

When the main body of the apparatus is completely stopped and the recording sheet P stagnating in the sheet conveying path 130 is removed, the guide member 161 and the separating claw 124 are restored to their initial positions shown in FIG. 16 by the action of the resilient member 125.

Figure 21:
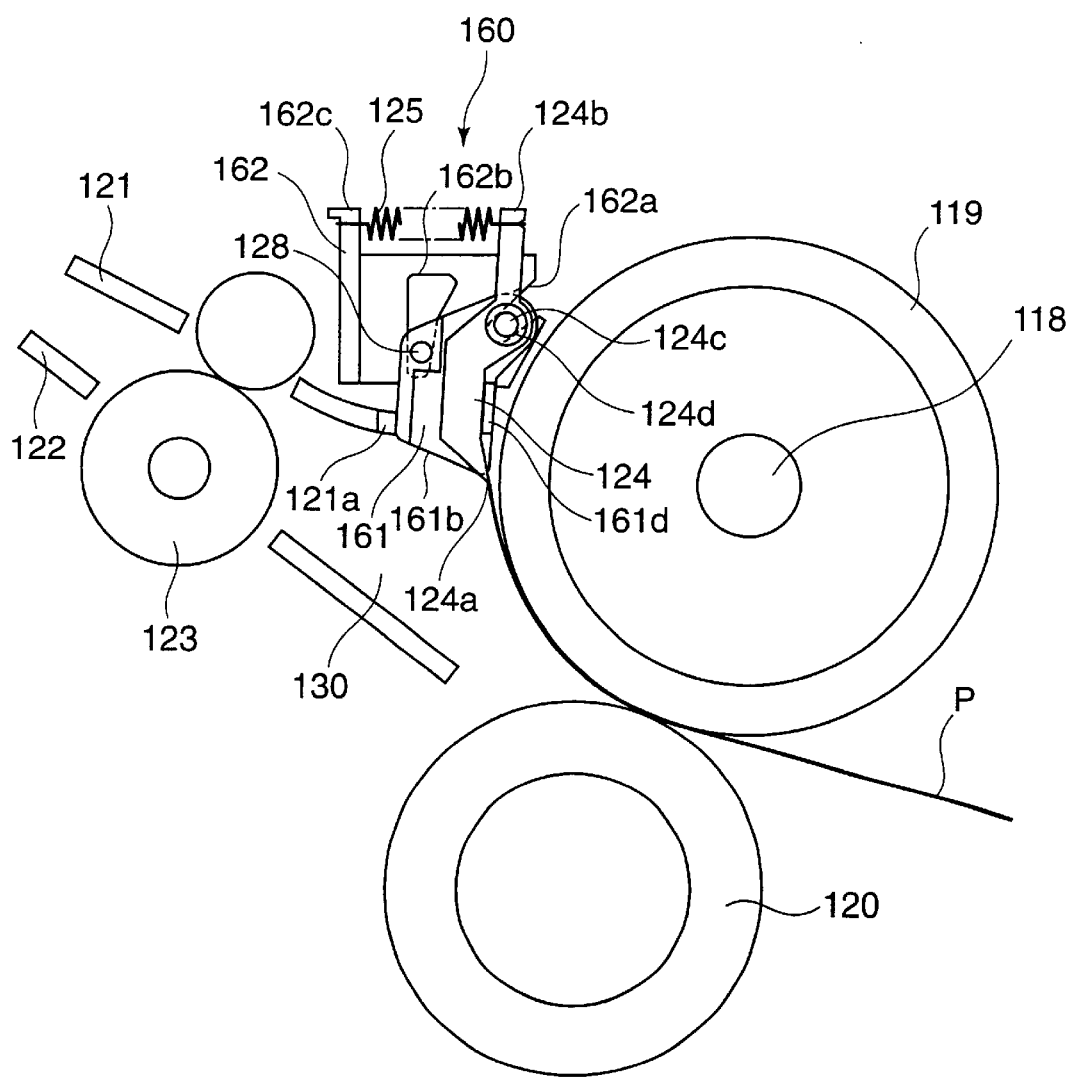
FIG. 21 is a view for illustrating the operation of the recording material separating apparatus in the fifth embodiment of the present invention.

Also, when as shown in FIG. 21, the separation of the leading end of the recording sheet P is not normally effected, the separating claw 124 is raised upwardly by the abutting force of the recording sheet P. When the separating claw 124 is moved upwardly along the U-shaped groove 162a, the guide member 161 is also moved and like the above-described action, the separating portion 124a of the separating claw 124 is spaced apart from the surface of the heating roller 119 and therefore, the heating roller 119 can be prevented from being injured.

Figure 22:
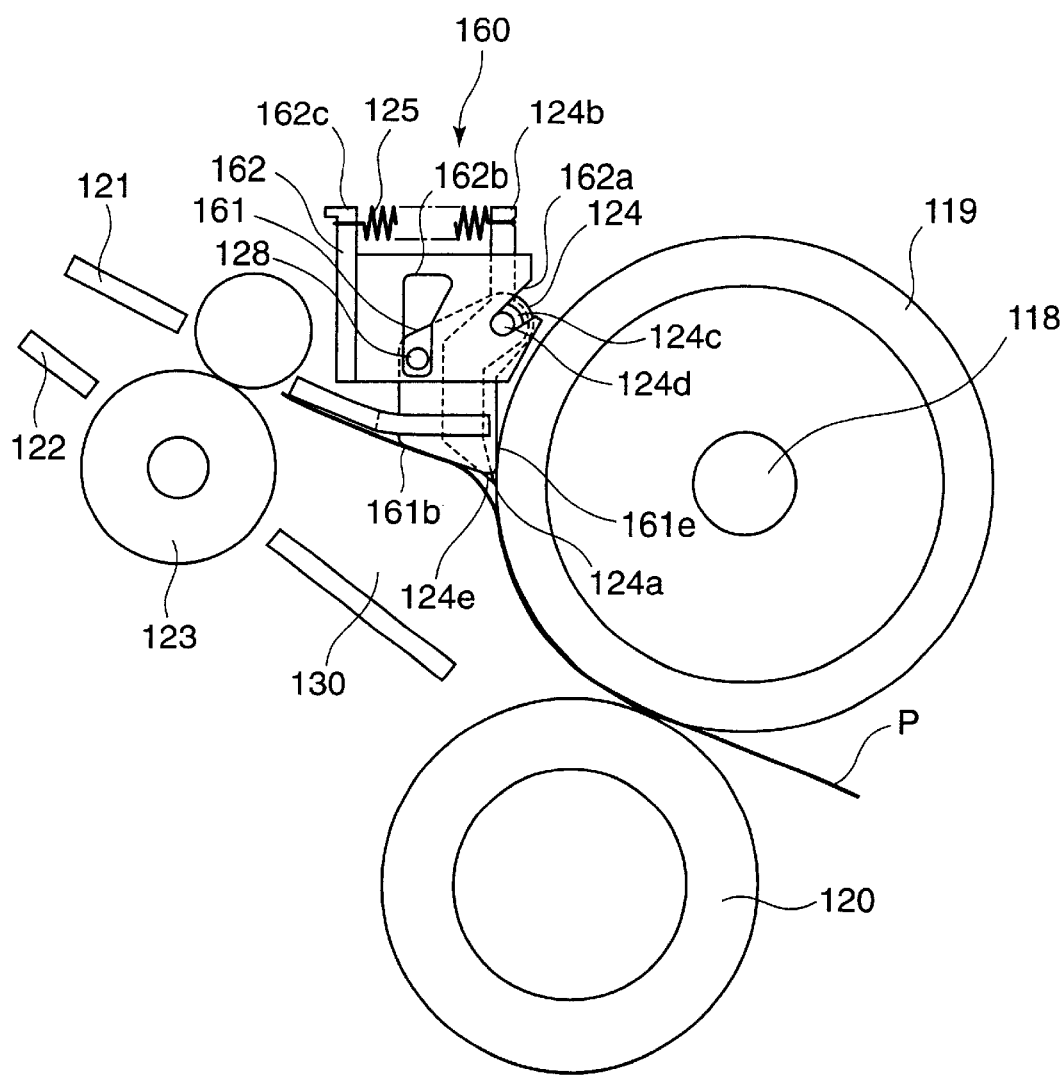
FIG. 22 is a view for illustrating the operation of the recording material separating apparatus in the fifth embodiment of the present invention.

Further, as shown in FIG. 22, the recording sheet P is conveyed while being separated from the heating roller 119 by the separating claw 124 and therefore, the recording sheet P is liable to abut against the guide member 161 or the separating claw 124 until the leading end thereof is nipped between and conveyed by the pair of fixing and discharge rollers 123. Particularly when a pattern of high print percentage is printed on the printed surface (the upper surface as viewed in the figure) of the recording sheet P, the problem of the printed surface rubbing against the separating claw to thereby cause a bad image is liable to arise. According to the present embodiment, however, the presence of the guide member 161 which is wide as compared with the separating claw 124 can mitigate the linear pressure with which the recording sheet P abuts, and it becomes difficult for a bad image to occur.

Also, most of the separating claw 124 except the separating portion 124a thereof is covered with the guide member 161 and therefore, it is difficult for the recording sheet P separated from the heating roller 119 to abut against the separating claw 124. That is, the abutting pressure of the separating claw 124 against the heating roller 119 when it is separating the recording sheet P is mitigated and therefore, the wear of the surface of the roller can be mitigated and it becomes possible to lengthen the life of the heating roller 119, i.e., the life of the fixing apparatus 113.

While in the present embodiment, a sheet separating apparatus has been described, a plurality of sheet separating apparatuses 160 may be arranged in the axial direction of the heating roller 119 in conformity with the width of the recording sheet used. Also, they may be arranged on the pressure roller 120 side, or may be arranged on both sides of the heating roller 119 and the pressure roller 120. Also, while a roller fixing device having a heating roller is used as the fixing apparatus 113 in the present embodiment, this is not restrictive, but use may be made of a surf fixing device using film or a fixing device using an induction heating member. Further, the fixing apparatus is not restrictive, but use may be made of a construction comprising a combination of an apparatus for conveying sheet-shaped articles and the sheet separating apparatus 160 of the present embodiment.

(Sixth Embodiment)

Figure 23:
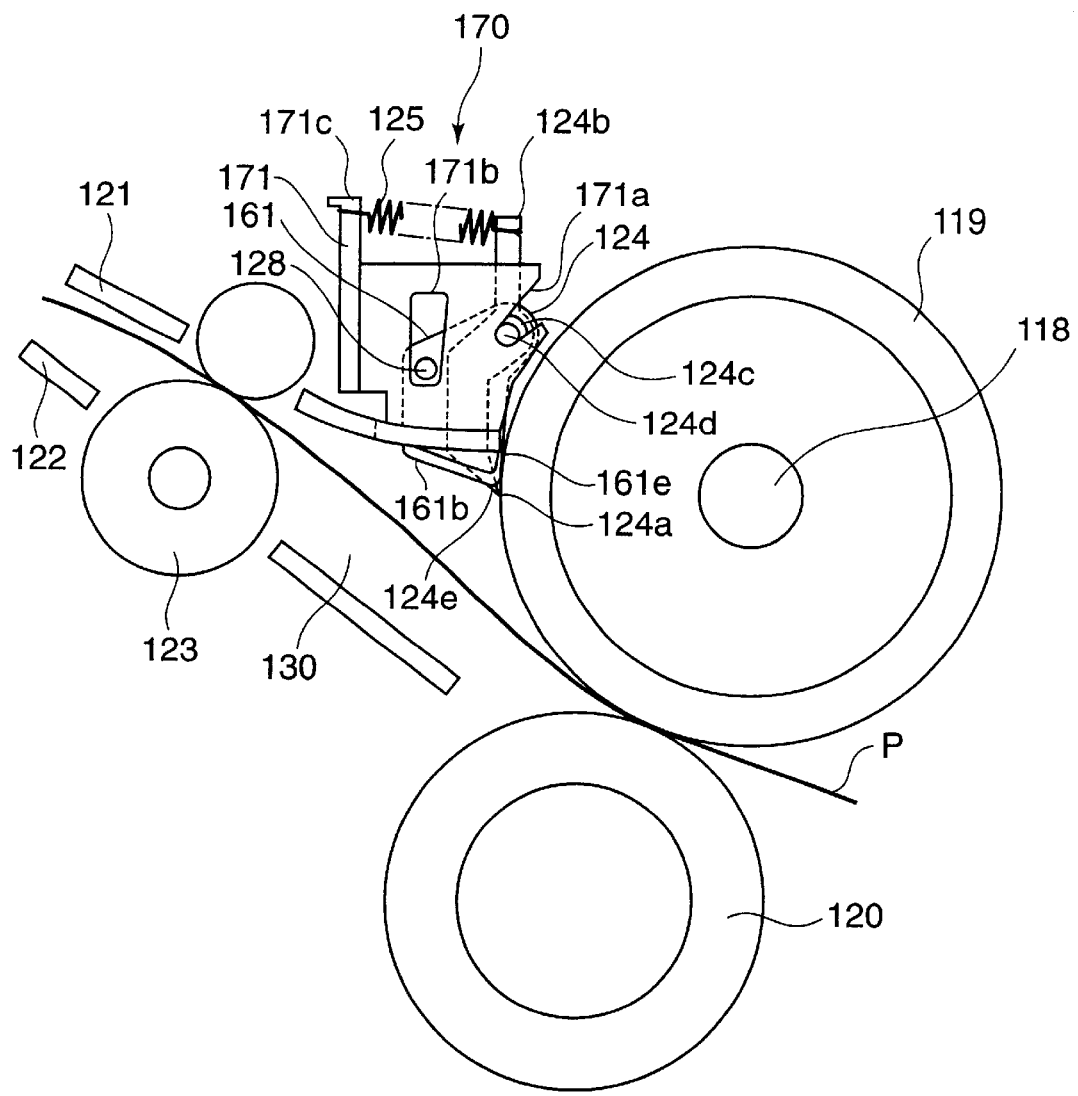
FIG. 23 is a typical cross-sectional view schematically showing the construction of a fixing apparatus provided with a recording material separating apparatus according to a sixth embodiment of the present invention.
Figure 24:
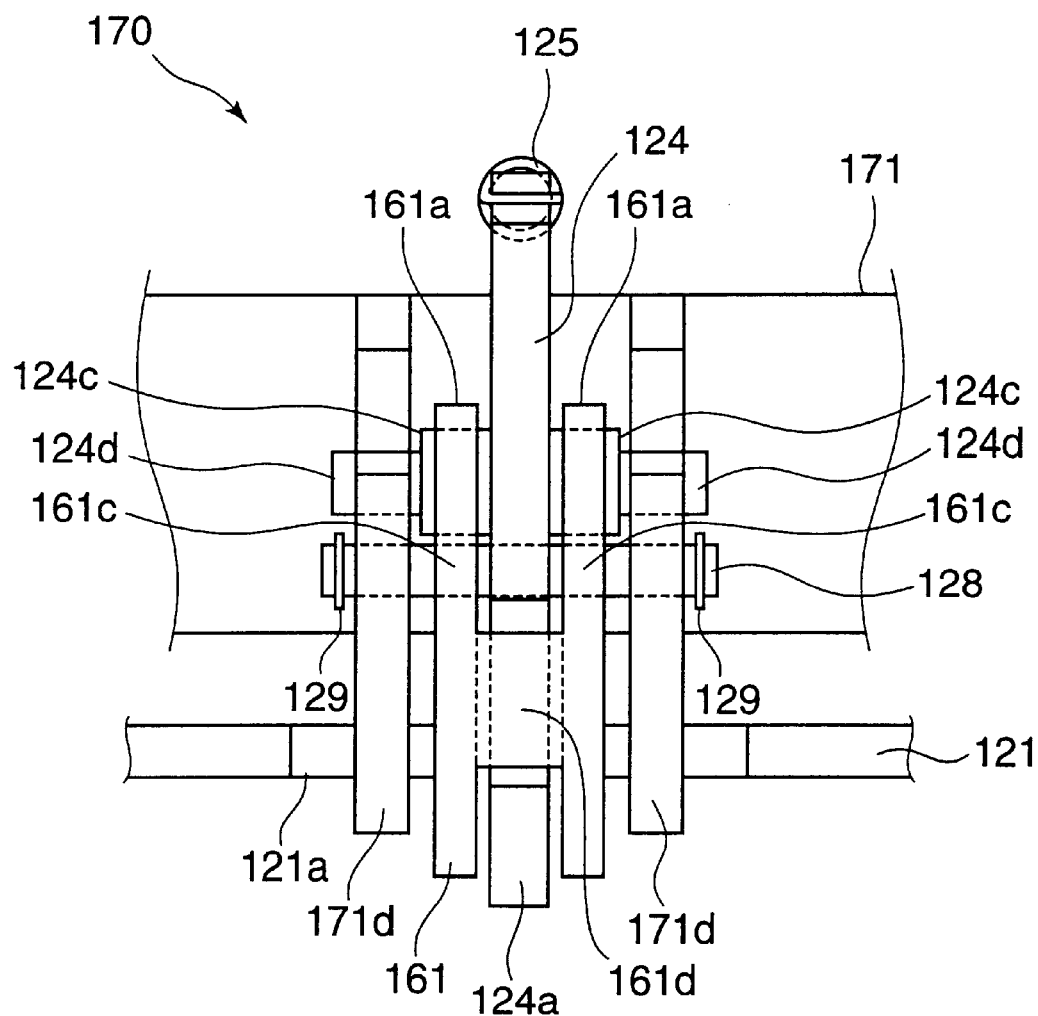
FIG. 24 is a right side view of the recording material separating apparatus provided in the fixing apparatus of FIG. 23.
Figure 25:
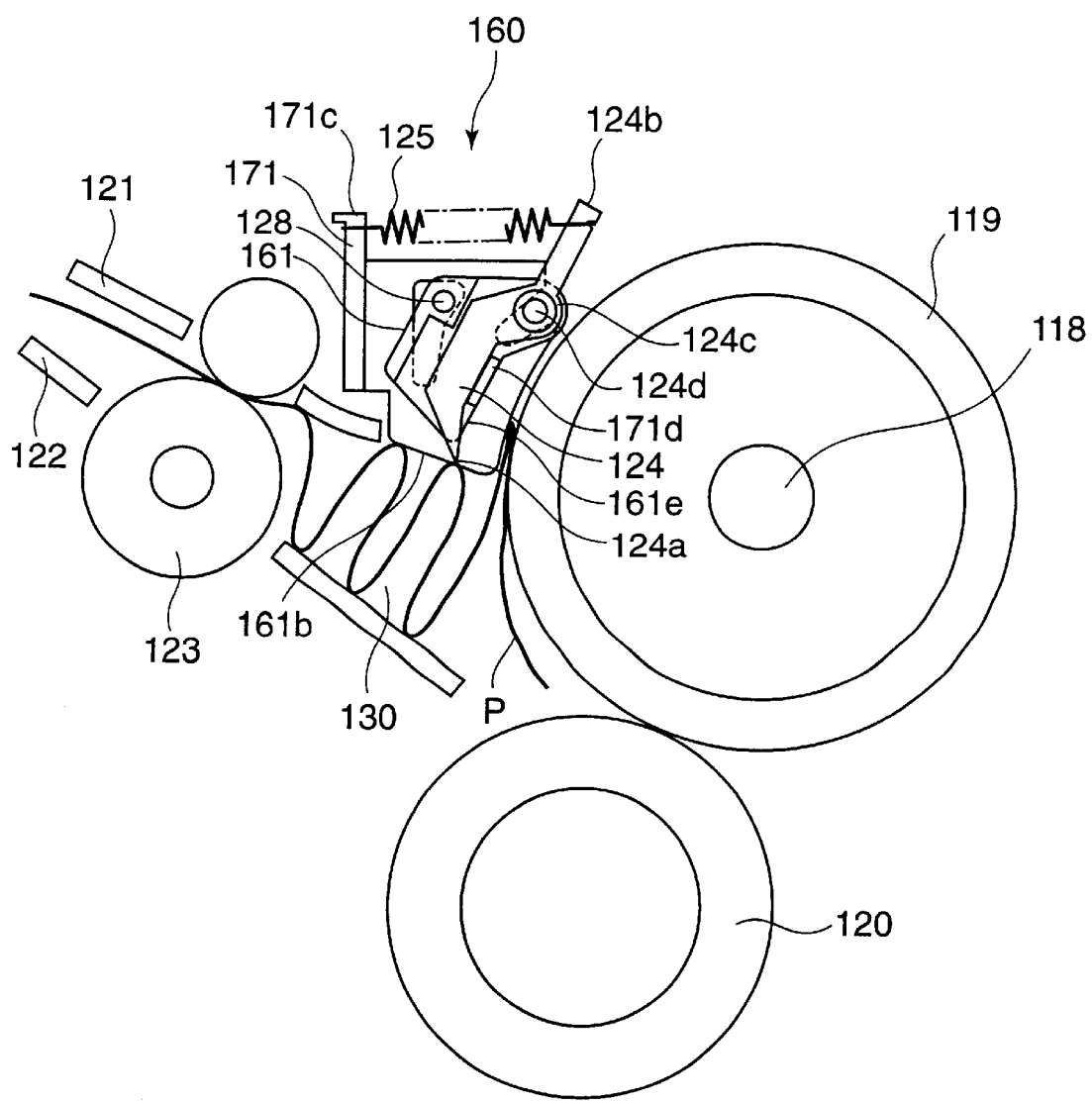
FIG. 25 is a view for illustrating the operation of the recording material separating apparatus in the sixth embodiment of the present invention.

A sheet separating apparatus 170 which is a recording material separating apparatus according to a sixth embodiment of the present invention will now be described with reference to FIGS. 23 to 25. FIG. 23 is a typical cross-sectional view schematically showing the construction of the sheet separating apparatus 170, and FIG. 24 is a right side view of the sheet separating apparatus 170. In this embodiment, members similar in construction to those in the first embodiment are given the same reference characters and need not be described.

As shown in FIG. 23, the sheet separating apparatus 170 is provided with a supporting member 171 differing in shape from that in the above-described first embodiment supporting the separating claw 124.

The both sides of the supporting member 171 are formed with guide portions 171d downwardly extending so as to completely cover the separating portion 124a of the separating claw 124 when the separating claw 124 is retracted. Also, the guide portion 161b of the guide member 161 keeps itself more protruded than the guide portion 171d of the supporting member 171.

Next, when bellows jam occurs as shown in FIG. 24, the wavy recording sheet P abuts against the guide portion 161b of the guide member 161 as in the above-described fifth embodiment, whereby in operative association with the movement of the guide member 161, the separating portion 124a of the separating claw 124 is spaced apart from the heating roller 119.

Thereafter, when the recording sheet P is further folded into a plurality and becomes jammed, the guide member 161 and the separating claw 124 are raised by the recording sheet P and retracted as in the above-described first embodiment. At this time, the separating claw 124 is completely housed in the supporting member 171. Also, even if the recording sheet P comes into between the heating roller 119 and the supporting member 171, the bellows-shaped recording sheet P does not contact with the separating portion 124a of the separating claw 124. That is, excessively great abutting pressure by the recording sheet P is not applied to the separating portion 124a of the separating claw 124 and therefore, the separating portion 124a can be prevented from being damaged.

Consequently, as described above, according to the fifth embodiment or the sixth embodiment, when the jam of the recording sheet occurs downstream of the fixing apparatus, the bellows-shaped sheet abuts against the guide member before it abuts against the separating claw, whereby the guide member is retracted, and in operative association with the retraction, the tip end of the separating claw is spaced apart from the heating roller and thus, it becomes possible to prevent the surface of the heating roller from being injured by the separating claw.

Also, according to the fifth embodiment or the sixth embodiment, the positional accuracy of the guide member and the separating claw is improved and therefore, it never happens that the recording sheet is caught by the abutting portion of the guide member, and it becomes possible to prevent such problems as jam and the breakage of the leading end of the recording sheet.

Further, according to the sixth embodiment, the tip end of the separating claw is contained in the supporting member during the retraction thereof and therefore, the bellows-shaped recording sheet can be prevented from contacting with the separating portion of the separating claw and damaging the separating portion by excessively great abutting pressure and thus, the separating performance of the sheet can be maintained for a long time.

Also, according to the fifth embodiment or the sixth embodiment, during the retraction of the separating claw, the separating portion thereof is spaced apart from the surface of the heating roller while being moved in a direction in which it becomes free to escape from the surface of the heating roller and therefore, it becomes possible to prevent an injury from occurring during the time until the separating claw is completely spaced apart from the surface of the heating roller.

Furthermore, according to the fifth embodiment or the sixth embodiment, when the separation of the leading end of the recording sheet from the heating roller is not normally effected, even if an excessive load by the recording sheet is applied to the separating claw, it is possible to prevent the heating roller from being injured by the separating claw because the separating claw is spaced apart from the heating roller.

Also, according to the fifth embodiment or the sixth embodiment, the recording sheet separated from the heating roller by the separating claw is guided by the guide member wider than the width of the separating claw and therefore, the bearing pressure acting on the recording sheet can be mitigated and it becomes possible to prevent the occurrence of bad images.

Further, according to the fifth embodiment or the sixth embodiment, the abutting pressure against the separating claw when the recording sheet separated from the heating roller by the separating claw is conveyed is mitigated and therefore, the wear of the surface of the heating roller by the separating claw can be mitigated, and it becomes possible to lengthen the life of the heating roller.

Also, according to the fifth embodiment or the sixth embodiment, there can be supplied a sheet separating apparatus which is of an easy construction and therefore is inexpensive and high in reliability as compared with the prior art.

While the embodiments of the present invention have been described above, the present invention is not restricted to these embodiments, but all modifications are possible within the technical idea of the invention.

What is claimed is:

1. A recording material separating apparatus comprising:

a rotary member contacting with a recording material;

a separating member for contacting with said rotary member and separating the recording material from said from said rotary member; and a guide member for guiding that surface of the recording material separated from said rotary member which is adjacent to said rotary member, said guide member being retractable from a guide position by pressure which occurs when the recording material jams; and separating claw retracting means for retracting a separating claw from a separating portion in conjunction with movement of said guide member movable independently of the separating claw.

2. A recording material separating apparatus according to claim 1, wherein said separating member and said guide member are fixed to a common shaft, and when said guide member is retracted, said separating member is also retracted by the shaft being rotated.

3. A recording material separating apparatus according to claim 1, wherein said guide member is wider than said separating member.

4. A recording material separating apparatus according to claim 1, wherein said guide member is provided on both sides of said separating member.

5. A recording material separating apparatus according to claim 1, wherein said rotary member is a fixing rotary member for fixing an unfixed image on the recording material.

6. A recording material separating apparatus according to claim 5, wherein said rotary member is heated by a heater.

7. A recording material separating apparatus according to claim 6, wherein said heater is a halogen heater.

8. A recording material separating apparatus according to claim 1, wherein said rotary member is heated by a halogen heater.

* * * * *

UNITED STATES PATENT AND TRADEMARK OFFICE
CERTIFICATE OF CORRECTION

PATENT NO. : 6,658,229 B2
DATED : December 2, 2003
INVENTOR(S) : Masao Ando et al.

It is certified that error appears in the above-identified patent and that said Letters Patent is hereby corrected as shown below:

Column 3,
Line 58, "pain" should read -- pain of --.

Column 14,
Line 50, "into" should be deleted.

Column 16,
Line 14, "from said" should be deleted.

Signed and Sealed this

Fifteenth Day of June, 2004

JON W. DUDAS
*Acting Director of the United States Patent and Trademark Office*